(12) United States Patent
Chen

(10) Patent No.: US 11,593,429 B2
(45) Date of Patent: Feb. 28, 2023

(54) SYSTEMS AND METHODS FOR PRESENTING AUXILIARY VIDEO RELATING TO AN OBJECT A USER IS INTERESTED IN WHEN THE USER RETURNS TO A FRAME OF A VIDEO IN WHICH THE OBJECT IS DEPICTED

(71) Applicant: Rovi Guides, Inc., San Jose, CA (US)

(72) Inventor: Amy Chen, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 105 days.

(21) Appl. No.: 16/982,358

(22) PCT Filed: Mar. 21, 2018

(86) PCT No.: PCT/US2018/023542
§ 371 (c)(1),
(2) Date: Sep. 18, 2020

(87) PCT Pub. No.: WO2019/182583
PCT Pub. Date: Sep. 26, 2019

(65) Prior Publication Data
US 2021/0034668 A1     Feb. 4, 2021

(51) Int. Cl.
*G06F 16/783*   (2019.01)
*G06F 16/2457*  (2019.01)
(Continued)

(52) U.S. Cl.
CPC .... *G06F 16/7837* (2019.01); *G06F 16/24578* (2019.01); *G06F 16/735* (2019.01);
(Continued)

(58) Field of Classification Search
CPC .......... G06F 16/7837; G06F 16/24578; G06F 16/735; G06F 16/738; G06F 16/743;
(Continued)

(56) References Cited

U.S. PATENT DOCUMENTS 5,237,627 A    8/1993  Johnson
6,239,794 B1   5/2001  Yuen
(Continued)

FOREIGN PATENT DOCUMENTS

CN    101232612 A  *  7/2008
CN    102802055 A  * 11/2012  ........... G06F 16/748
(Continued)

OTHER PUBLICATIONS

The IP.com Journal; https://ip.com/IPCOM/000254079; May 31, 2018 (Year: 2018).*
(Continued)

*Primary Examiner* — Dennis Truong
(74) *Attorney, Agent, or Firm* — Haley Guiliano LLP

(57) ABSTRACT

Systems and methods are described herein for a media guidance application that detects, and responds to, a user's review of video content on a media device. The media guidance application detects a rewind operation during playback of a video comprising a media asset. In response, the media guidance application determines if the playback position reached during the rewind operation occurs during a first break in the media asset and, if so, identifies objects depicted in the video at the playback position, and presents auxiliary video relating to an object at a second break in the media asset.

18 Claims, 10 Drawing Sheets

(51) Int. Cl.
*G06F 16/735* (2019.01)
*G06F 16/17* (2019.01)
*G06F 16/74* (2019.01)
*G11B 27/00* (2006.01)
*G06Q 30/02* (2012.01)
*H04N 21/258* (2011.01)
*H04N 21/81* (2011.01)
*G06F 16/738* (2019.01)
*G11B 27/34* (2006.01)
*G06Q 30/0251* (2023.01)

(52) U.S. Cl.
CPC .......... *G06F 16/738* (2019.01); *G06F 16/743* (2019.01); *G11B 27/005* (2013.01); *G11B 27/34* (2013.01); *G06Q 30/0251* (2013.01); *H04N 21/25891* (2013.01); *H04N 21/812* (2013.01)

(58) Field of Classification Search
CPC ..... G06F 16/748; G11B 27/005; G11B 27/34; G06Q 30/0251; H04N 21/25891; H04N 21/812
See application file for complete search history.

(56) References Cited

U.S. PATENT DOCUMENTS

| | | | |
|---|---|---|---|
| 6,496,981 B1 * | 12/2002 | Wistendahl | H04N 21/234318 348/E7.054 |
| 6,564,378 B1 | 5/2003 | Satterfield | |
| 6,993,184 B2 | 1/2006 | Matsugu | |
| 7,003,161 B2 | 2/2006 | Tessadro | |
| 7,165,098 B1 | 1/2007 | Boyer | |
| 7,761,892 B2 | 7/2010 | Ellis | |
| 8,046,801 B2 | 10/2011 | Ellis | |
| 8,595,773 B1 * | 11/2013 | Wang | H04N 21/472 705/26.1 |
| 9,319,745 B2 * | 4/2016 | Rankine | H04N 21/8583 |
| 9,501,702 B2 * | 11/2016 | Skarakis | H04N 21/45455 |
| 2002/0174430 A1 | 11/2002 | Ellis | |
| 2005/0251827 A1 | 11/2005 | Ellis | |
| 2007/0156521 A1 | 7/2007 | Yates | |
| 2009/0210899 A1 * | 8/2009 | Lawrence-Apfelbaum | H04N 21/4335 725/115 |
| 2010/0153885 A1 | 6/2010 | Yates | |
| 2012/0185895 A1 | 7/2012 | Wong | |
| 2013/0139192 A1 * | 5/2013 | Fontan | G06Q 30/0241 725/8 |
| 2014/0032311 A1 * | 1/2014 | Cramer | H04L 67/22 705/14.54 |
| 2014/0250447 A1 * | 9/2014 | Schink | H04N 21/478 725/10 |
| 2015/0106198 A1 * | 4/2015 | Miller | G06Q 30/0251 705/14.52 |
| 2015/0245101 A1 | 8/2015 | Stathacopoulos | |
| 2015/0296250 A1 * | 10/2015 | Casper | H04N 21/23418 725/34 |
| 2015/0350729 A1 * | 12/2015 | Reynolds | H04N 21/44008 725/34 |
| 2016/0366203 A1 * | 12/2016 | Blong | H04L 51/32 |
| 2017/0024098 A1 * | 1/2017 | Doherty | G06F 3/0485 |
| 2017/0040002 A1 * | 2/2017 | Basson | G06F 3/147 |
| 2017/0118515 A1 * | 4/2017 | Dey | H04N 21/84 |
| 2017/0188115 A1 * | 6/2017 | Bafekr | H04N 21/6582 |
| 2018/0124438 A1 * | 5/2018 | Barnett | H04N 21/4826 |
| 2018/0300510 A1 * | 10/2018 | Lam | G06F 21/6245 |
| 2020/0084483 A1 * | 3/2020 | Brown | H04L 9/3257 |
| 2020/0194004 A1 * | 6/2020 | Bates | H04L 67/125 |

FOREIGN PATENT DOCUMENTS

| | | | | |
|---|---|---|---|---|
| CN | 105786423 A | * | 7/2016 | ............. G02B 26/00 |
| CN | 106686254 A | * | 5/2017 | ........ H04M 1/72572 |
| CN | 104025608 B | * | 12/2017 | ......... H04L 63/0428 |
| CN | 108282684 A | * | 7/2018 | |
| CN | 111079741 A | * | 4/2020 | |
| CN | 113055732 A | * | 6/2021 | |
| WO | WO-2013122577 A1 | * | 8/2013 | ......... G06Q 30/0242 |

OTHER PUBLICATIONS

PCT International Search Report for International Application No. PCT/US2018/023542, dated Jun. 6, 2018 (14 pages).

* cited by examiner

SYSTEMS AND METHODS FOR PRESENTING AUXILIARY VIDEO RELATING TO AN OBJECT A USER IS INTERESTED IN WHEN THE USER RETURNS TO A FRAME OF A VIDEO IN WHICH THE OBJECT IS DEPICTED

CROSS-REFERENCE TO RELATED APPLICATIONS

This application is a national stage application under 35 U.S.C. § 371 of International Application PCT/US2018/023542, filed Mar. 21, 2018, which is hereby incorporated by reference herein in its entirety.

BACKGROUND

While watching a video, a user may see an object which interests him or her. The user may wish to learn more about the object. This results in the user either attempting to identify the object and manually searching for information relating thereto, or simply hoping for a serendipitous return of the object in the video. If the user is unable to identify the object with certainty, or if the object is not displayed again during the video, the user may be unable to learn more about the object.

SUMMARY

The advancement of digital transmission of media content has increased the amount of data that can be transmitted. In particular, media systems may transmit metadata that includes detailed information about media content. This metadata may include descriptions and tags to objects depicted within the media asset. While this information, by itself, is not useable for displaying to a human user, computer processors can read and interpret this information. However, while computer processors may read and interpret this information and generate media content for display that may be useable by a human user (e.g., output media content on a display screen in a human recognizable format), these systems still fail to solve the aforementioned problem when implemented in computer systems because the computer processor is unable to determine the object or objects in which the user is actually interested.

Accordingly, systems and methods are described herein for a media guidance application that detects and responds to a user's review of video content on a media device. Specifically, the media guidance application detects a rewind operation during playback of a video comprising a media asset. In response, the media guidance application determines if the playback position reached during the rewind operation occurs during a first break in the media asset and, if so, stores metadata describing an object depicted in the video at the playback position and presents auxiliary video relating to the object at a second break in the media asset. Accordingly, the user is provided with additional video describing the object in which he or she is interested without the need for the user to manually locate such descriptions.

For example, the media guidance application may detect (e.g., using control circuitry of the media device) during presentation of a video comprising a media asset, a rewind operation. In response, the media guidance application may determine (e.g., via reading and interpreting metadata of the video) whether a playback position reached during the rewind operation occurs during a first break in the media asset. If the media guidance application determines that the playback position reached is during a first break in the media asset, the media guidance application may store metadata describing an object depicted in the video at the playback position. The media guidance application may detect, during presentation of the video, a second break in the video, and present, during the second break in the video, auxiliary video describing the object based on the stored metadata.

As an example, the user may be watching a video comprising an episode of "The Big Bang Theory" on the media device. During the video, the user may see an object in which he or she is interested. The object may be an item, a product, a location, a landmark, or any other suitable object which may catch the user's interest. The user may rewind the video to the point at which they say the object in order to see it again. The media guidance application may, in response to the rewind operation, extract and store metadata describing an object depicted in the video at that point. When the media guidance application detects a later break in the media asset, the media guidance application may present, during the break, auxiliary video describing the object, based on the stored metadata. Accordingly, the user is presented with video relating to the object in which he or she is interested.

In some aspects, the media guidance application may generate for display, on a media device, a video comprising a media asset. For example, the media guidance application may generate for display video content comprising an episode of "The Big Bang Theory". The video may be generated for display from a broadcast stream received at the media device or from a recording stored in a memory of the media device.

The media guidance application may receive, from a user input interface, during playback of the video, a rewind command. For example, a user may press a rewind button on a remote control. As another example, a user may use an application on his or her smartphone, tablet, or other personal device to control playback of the video. In response to receiving the rewind command, the media guidance application may perform a rewind operation. The rewind command may specify a specific point within the video to which the user wants to return. Alternatively, the rewind command may be an open-ended command requiring a further command from the user input interface to terminate the rewind operation and/or resume playback of the video.

The media guidance application may determine an end point of the rewind operation. For example, if the rewind command specifies a specific point within the video to which the user wants to return, the media guidance application may extract from the rewind command data indicating the specified point. Alternatively, if the rewind command is open-ended, the media guidance application may determine the end point of the rewind operation to be the point reached by the media guidance application at the time the command to terminate the rewind operation was received. The media guidance application may identify the playback position at which the rewind command is terminated. For example, the media guidance application may determine from metadata of the video a timestamp thereof at the point at which the rewind command was terminated.

The media guidance application may determine if the playback position reached during the rewind operation is during a break in the media asset which the video comprises. For example, the video may comprise an episode of "The Big Bang Theory" which includes several break points at which advertisements may be inserted by broadcasters. The media guidance application may determine, for example, based on metadata of the video, whether the playback position reached during the rewind operation falls within the episode of the "The Big Bang Theory" or within a break point.

If the playback position reached during the rewind operation is during a break in the media asset, the media guidance application may access metadata associated with the break. The media guidance application may identify a subset of the metadata associated with the break describing an object depicted in the video. The media guidance application may extract the identified subset of metadata. For example, the media guidance application may copy the metadata related to the video content. The media guidance application may store the identified subset of the metadata. For example, the media guidance application may store the metadata relating to video content in a storage device accessible by the media guidance application.

The media guidance application may detect a second break during playback of the video. For example, the media guidance application may detect a second break point in the "The Big Bang Theory" media asset. The media guidance application may generate for display, based on the metadata, during the second break, auxiliary video describing the object. For example, the media guidance application may generate for display video content describing the object in which the user is interested during the second break point. Once again, the user is provided with additional video describing the object in which he or she is interested without the need for the user to manually locate such descriptions.

In some embodiments, the media guidance application may process a frame of the video at the playback position to identify a plurality of candidate objects depicted in the frame. For example, the media guidance application may use edge detection to identify several objects included in the frame. The media guidance application may search a database of videos and associated objects for each of the plurality of candidate objects. For example, the media guidance application may access a database which relates at least one video with each of a number of objects. For example, if a specific make and model of car, such as a Tesla Model 3, is depicted in the frame, the media guidance application may search the database for videos associated with a Tesla Model 3.

The media guidance application may identify a plurality of candidate objects having an associated video. For example, several objects may be depicted in the frame along with the Tesla Model 3, such as a bicycle, a flock of birds, and a waterfall. The media guidance application may search the database for videos related to each of these objects, and identify videos related to the Tesla Model 3, bicycles, and waterfalls, but may find no videos related to a flock of birds.

The media guidance application may access, from a profile associated with the user, user interest data. For example, the user interest data may include the user's social media activity, online search history, online purchase history, and other personal data indicative of the user's interests. The media guidance application may retrieve metadata associated with each of the plurality of candidate objects, and compare the metadata of each of the plurality of candidate objects with the user interest data. For example, the media guidance application may retrieve metadata relating to the Tesla Model 3 and compare it with user interest data indicating that the user has been searching for an electric car. The media guidance application may generate a ranked list of the plurality of candidate objects based on the comparison. For example, if the user has recently been searching for electric cars, or has searched for electric cars more than a threshold number of times, the media guidance application may place the Tesla Model 3 as the top ranked candidate object. If the user has occasionally searched for a bicycle or bought a bicycle a long time ago, the media guidance application may place the bicycle in a lower-ranked position in the list. The media guidance application may then select, as the object depicted in the video in which the user is interested, the candidate object having the highest rank. By refining the list of candidate objects using user interest data, the media guidance application can better determine the object in which the user is interested.

In some embodiments, the media guidance application may identify a plurality of objects depicted in the frame that satisfy predetermined criteria. For example, the media guidance application may be configured to only identify objects which appear in the background of the frame, or are otherwise too small or indistinct to be easily identified by the user. In the above example, the Tesla Model 3 may appear in the foreground of the frame. Therefore, the media guidance application may identify only the bicycle, the flock of birds, and the waterfall. The media guidance application may compare each of the plurality of objects to a list of excluded objects. For example, the media guidance application may be configured to exclude background animals which cannot be positively identified by species. The media guidance application may determine, based on the comparison, as the plurality of candidate objects, a subset of the plurality of objects which do not appear on the list of excluded objects. Continuing the above example, though the flock of birds may satisfy the predetermined criteria, they cannot be identified as a particular species of bird. The media guidance application may therefore exclude it from the plurality of candidate objects. By excluding certain objects from consideration, the media guidance application can eliminate ubiquitous objects and better determine the object in which the user is interested.

In some embodiments, the media guidance application may receive, from the user input interface, during playback of the auxiliary video, a fast-forward command. The media guidance application may determine, in response to receiving the fast-forward command, that the user is not interested in the object depicted in the auxiliary video. Continuing the above example, the media guidance application may select the bicycle as the object in which the user is interested and generate for display auxiliary video describing the bicycle. The user may not actually be interested in the bicycle and may choose to fast-forward through the auxiliary video describing the bicycle. The media guidance application may determine, based on the user's fast-forward command during the auxiliary video, that the user is not interested in the bicycle. In response to this determination, the media guidance application may remove the object from the ranked list. For example, if the user fast-forwarded through the bicycle auxiliary video, the media guidance application may remove the bicycle from the ranked list so that future auxiliary video presented to the user will not be video describing the bicycle. By considering how the user interacts with the auxiliary video, the media guidance application can better determine the object in which the user is interested.

In some embodiments, the media guidance application may select a second object of the plurality of objects having a second-highest rank. For example, based on the user interest data, the bicycle may be the highest ranked object, and the waterfall may be the second-highest ranked object. The media guidance application may therefore select the waterfall. The media guidance application may detect a third break during playback of the video and, in response to detecting the third break, generate for display, during the third break, second auxiliary video describing the second object. For example, the media guidance application may detect another break point in the episode of "The Big Bang Theory" and generate for display, during that break, video describing the waterfall. By selecting a second object about which to display auxiliary video, the user is provided with additional video about multiple objects in which he or she may be interested.

In some embodiments, the media guidance application may assign, based on the rank, a weighting factor to each candidate object of the plurality of candidate objects. For example, the ranked list may include multiple objects, some of which have the same rank. The media guidance application may assign each object a weighting factor corresponding to its rank. The weighting factor may be a number between zero and one. For example, the Tesla Model 3 may be the highest-ranked object and may be assigned a weighting factor of one. The next two objects in the ranked list may carry the same rank and may therefore both be assigned a weighting factor of, for example, 0.5. The media guidance application may select an object of the plurality of objects based on the weighting factors. For example, a larger weighting factor of an object may result in the media guidance application being more likely to select that object. The media guidance application may detect a third break in the video and generate for display, during the third break, auxiliary video describing the selected object. By using a weighting factor, the media guidance application may select an object about which to display auxiliary video during each break encountered during the video, displaying video relating to higher-ranked objects more often than lower-ranked objects, while still displaying, over time, video relating to each object on the list.

In some embodiments, the media guidance application may determine whether a threshold amount of time has passed since a candidate object was added to the ranked list. The ranked list may be maintained for a long period of time, and may include objects depicted in multiple frames. In order to remove objects that may no longer interest the user, the media guidance application may record the time at which each object was added to the ranked list and compare the recorded time with the current time to determine if a threshold amount of time has passed. In response to determining that the threshold amount of time has passed, the media guidance application may remove the candidate object from the ranked list. By removing older objects from the ranked list, the media guidance application ensures that the auxiliary video generated for display is of the highest possible interest to the user.

In some embodiments, the media guidance application may receive from the user input interface, during playback of the video, a second rewind command. The media guidance application may perform a second rewind operation in response to the second rewind command. The media guidance application may determine an end point of the second rewind operation and determine if the playback position reached during the second rewind operation is during a break in the video. If so, the media guidance application may process a second frame of the video at the playback position to identify a second plurality of candidate objects depicted in the frame. The media guidance application may search the database of videos and associated objects for each of the second plurality of objects, and identify a second plurality of candidate objects having an associated video. The media guidance application may access, from the profile associated with the user, user interest data. The media guidance application may retrieve metadata associated with each of the second plurality of candidate objects and compare the metadata of each of the plurality of candidate objects with the user interest data. The media guidance application may update the ranked list of the plurality of candidate objects based on this comparison. The media guidance application may select, as the object depicted in the video, a candidate object of the plurality of candidate objects having the highest rank. By updating the ranked list based on a second rewind command, the media guidance application ensures that the user's interest in multiple objects is reflected in the ranked list, and that auxiliary video describing each of the objects may be generated for display.

In some embodiments, the media guidance application may store the ranked list in the profile associated with the user. The profile may be stored on a remote server or may be stored locally. The media guidance application may detect the user's presence at a second media device. For example, the user may log in to a second media device, to his or her personal computer, or his or her smartphone or tablet. The media guidance application may generate for display, on the second media device, auxiliary video describing the highest-ranked object. For example, if the user logs in to his or her smartphone, auxiliary video describing the highest-ranked object on the ranked list of objects may be displayed to the user at an appropriate time on the user's smartphone. By storing the ranked list in the user profile, the media guidance application may generate for display auxiliary content that is of interest to the user on multiple devices.

In some embodiments, the media guidance application may determine that a second user is co-located with the user. For example, the user and his or her friend may be watching the video together. The media guidance application may detect a negative reaction from the second user during playback of the auxiliary video. For example, during playback of the auxiliary video, the user's friend may make a verbal comment, frown, or otherwise indicate displeasure with the auxiliary content. The media guidance application may be configured to detect such reactions, such as through a camera or microphone connected to the media device. The media guidance application may prevent further display of the auxiliary video and begin monitoring the location of the second user. The media guidance application may detect that the second user is no longer co-located with the user. For example, using a camera, the media guidance application may detect that the user's friend is no longer watching with the user. The media guidance application may again generate for display to the user the auxiliary video. By suppressing display of the auxiliary content while a second user is present, the user need not fast-forward through the auxiliary video in which he or she is interested, which may otherwise signal to the media guidance application that the user is not interested in the auxiliary video.

Alternatively, the media guidance application may detect a pause operation. The media guidance application may perform the above methods based on the playback position at which a pause command was received. The media guidance application may detect an object in several consecutive frames, after which the user may pause playback of the video. If the playback position at which the pause command was received occurs during a break in the media asset, the media guidance application may proceed to perform the object detection and selection methods described above.

It should also be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a media guidance application that detects and responds to a user's review of video content on a media device. Specifically, the media guidance application detects a rewind operation during playback of a video comprising a media asset. In response, the media guidance application determines if the playback position reached during the rewind operation occurs during a first break in the media asset and, if so, stores metadata describing an object depicted in the video at the playback position and presents auxiliary video relating to the object at a second break in the media asset. Accordingly, the user is provided with additional video describing the object in which he or she is interested without the need for the user to manually locate such descriptions.

For example, the media guidance application may detect during presentation of a video comprising a media asset, a rewind operation. In response, the media guidance application may determine whether a playback position reached during the rewind operation occurs during a first break in the media asset. If the media guidance application determines that the playback position reached is during a first break in the media asset, the media guidance application may store metadata describing an object depicted in the video at the playback position. The media guidance application may detect, during presentation of the video, a second break in the video, and present, during the second break in the video, auxiliary video describing the object based on the stored metadata.

As an example, the user may be watching a video comprising an episode of "The Big Bang Theory" on the media device. During the video, the user may see an object in which he or she is interested. The object may be an item, a product, a location, a landmark, or any other suitable object which may catch the user's interest. The user may rewind the video to the point at which they say the object in order to see it again. The media guidance application may, in response to the rewind operation, extract and store metadata describing an object depicted in the video at that point. When the media guidance application detects a later break in the media asset, the media guidance application may present, during the break, auxiliary video describing the object based on the stored metadata.

In some aspects, the media guidance application may be configured to generate for display, on a media device, a video comprising a media asset. For example, the media guidance application may generate for display video content comprising an episode of "The Big Bang Theory". The video may be generated for display from a broadcast stream received at the media device, or from a recording stored in a memory of the media device. The media device may include an integrated display, such as on a smartphone or tablet, or may by connected to an external display device, such as a television.

Figure 1:
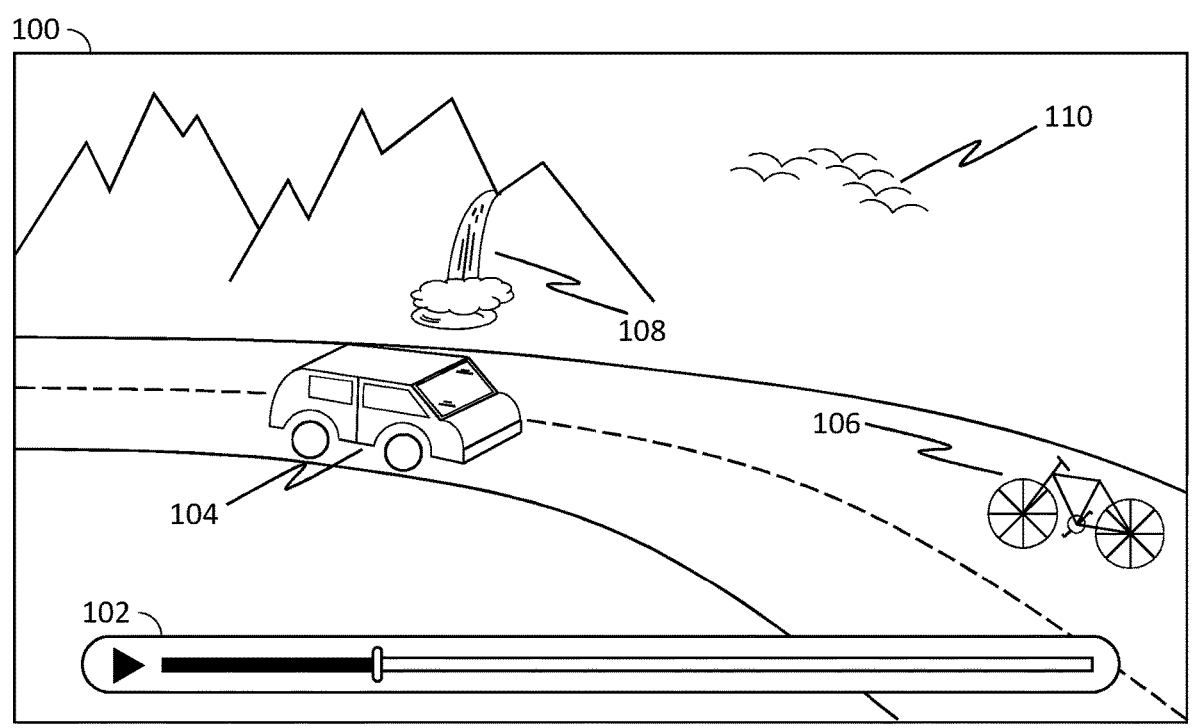
FIG. 1 shows an exemplary frame of a video at the end of a rewind operation according to an embodiment of the disclosure.

FIG. 1 shows an exemplary frame 100 of a video at the end of a rewind operation. Several objects are identified within the frame 100, including a car 104, a bicycle 106, a waterfall 108, and a flock of birds 110. Also displayed as an overlay over the frame 100 is playback bar 102 which includes a progress bar representing the user's current progress through the video.

The media guidance application may be configured to receive, from a user input interface, during playback of the video, a rewind command. The user input interface may be a remote control associated with the media device, a playback control application on a personal computing device such as a smartphone or tablet, or an on-screen playback control interface optionally displayed in an overlay over the video. For example, a user may press a rewind button on a remote control. As another example, a user may use an application on his or her smartphone, tablet, or other personal computing device to control playback of the video. As yet another example, the media device may be a smartphone or tablet with a touchscreen interface, and the user input interface may be displayed in an overlay over the video when the user touches the screen. The user may then control playback by tapping a rewind icon, or by interacting with a progress bar representing the user's progress through the video, such as that displayed in overlay 102. In response to receiving the rewind command, the media guidance application may perform a rewind operation. The rewind command may specify a specific point within the video to which the user wants to return. For example, the user may tap a specific point on the progress bar displayed in overlay 102, or may drag a pointer along the progress bar to a specific point. Alternatively, the rewind command may be an open-ended command, requiring a further command from the user input interface to terminate the rewind operation and/or resume playback of the video. For example, the user may press a rewind button on the user input interface, causing the media device to rewind through video until a stop or play command is received.

The media guidance application may be configured to determine an end point of the rewind operation. For example, if the rewind command specifies a specific point within the video to which the user wants to return, the media guidance application may extract from the rewind command data indicating the specified point. For example, the rewind command may include a timestamp or other indication of the point to which the user wishes to return. Alternatively, if the rewind command is open-ended, the media guidance application may determine the end point of the rewind operation to be the point reached by the media guidance application at the time the command to terminate the rewind operation was received. The media guidance application may identify the playback position at which the rewind command is terminated. For example, the media guidance application may determine from metadata of the video a timestamp thereof at the point at which the rewind command was terminated.

The media guidance application may be configured to determine if the playback position reached during the rewind operation is during a break in the media asset which the video comprises. For example, the video may comprise an episode of "The Big Bang Theory" which includes several break points at which advertisements may be inserted by broadcasters. The media guidance application may determine, for example, based on metadata of the video, whether the playback position reached during the rewind operation falls within the content of the episode of the "The Big Bang Theory" or within a break point.

If the playback position reached during the rewind operation is during a break in the media asset, the media guidance application may be configured to access metadata associated with the break. The media guidance application may identify a subset of the metadata associated with the break describing an object depicted in the video. For example, the media guidance application may identify metadata fields relating to multimedia properties such as resolution, aspect ratio, and audio sampling rate, and metadata fields relating to video content, such as descriptions, actors, and titles. The media guidance application may determine that the metadata fields relating to video content describe the object depicted in the video, and extract the relevant subset of metadata. For example, the media guidance application may copy the metadata related to the video content. The media guidance application may store the identified subset of the metadata. For example, the media guidance application may store the metadata relating to video content in a storage device accessible by the media guidance application.

The media guidance application may be configured to detect a second break during playback of the video. For example, the media guidance application may detect a second break point in the "The Big Bang Theory" media asset. The media guidance application may be configured to generate for display, based on the metadata, during the second break, auxiliary video describing the object. For example, the media guidance application may generate for display video content describing the object in which the user is interested during the second break point.

In some embodiments, the media guidance application may be configured to process a frame of the video at the playback position to identify a plurality of candidate objects depicted in the frame. For example, the media guidance application may use edge detection, pattern recognition, optical character recognition, predetermined object locations, or any other suitable technique or method to identify several objects included in the frame 100. Edge detection, pattern recognition, and optical character recognition are described in greater detail in Tessadro U.S. Pat. No. 7,003,161, issued Feb. 21, 2006, Matsugu U.S. Pat. No. 6,993,184, issued Jan. 31, 2006, Johnson et al. U.S. Pat. No. 5,237,627, issued Aug. 17, 1993, and Yates U.S. Patent Publication No. 2007/0156521, published Jul. 5, 2007, which are hereby incorporated by reference herein in their entireties. For example, the media guidance application may detect the edges of an object by analyzing the relative brightness of adjacent pixels in the frame, where a threshold change in brightness indicates the edge of an object, or may compare detected shapes with known text characters to identify specific words depicted in the frame. The media guidance application may identify car 104, bicycle 106, waterfall 108, and flock of birds 110. The media guidance application may perform image analysis on each object detected to determine the identity of each object. The media guidance application may be configured to search a database of videos and associated objects for each of the plurality of candidate objects. For example, the media guidance application may access a database which relates at least one video with each of a number of objects. For example, if a specific make and model of car 104, such as a Tesla Model 3, is depicted in the frame, the media guidance application may search the database for videos associated with a Tesla Model 3.

The media guidance application may be configured to identify a plurality of candidate objects having an associated video. For example, several objects may be depicted in the frame along with the Tesla Model 3, such as bicycle 106, waterfall 108, and flock of birds 110. The media guidance application may search the database for videos related to each of these objects, and identify videos related to the Tesla Model 3, bicycles, and waterfalls, but may find no videos related to a flock of birds.

The media guidance application may be configured to access, from a profile associated with the user, user interest data. For example, the user interest data may include the user's social media activity, online search history, online purchase history, and other personal data indicative of the user's interests. The media guidance application may be configured to retrieve metadata associated with each of the plurality of candidate objects having associated videos, and compare the metadata of each of the plurality of candidate objects with the user interest data. For example, the media guidance application may retrieve metadata relating to the Tesla Model 3, such as the type of vehicle (e.g., sedan) and fuel type (e.g., electric), and compare it with user interest data. The user interest data may indicate that the user has been searching for an electric car. The media guidance application may be configured to generate a ranked list of the plurality of candidate objects based on the comparison. For example, if the user has recently been searching for electric cars, the media guidance application may place the Tesla Model 3 as the top ranked candidate object. Alternatively, if the user has searched for electric cars more than a threshold number of times within a period of time, the media guidance application may place the Tesla Model 3 as the top ranked candidate object. If the user has occasionally searched for a bicycle or bought a bicycle a long time ago, the media guidance application may place the bicycle in a lower-ranked position in the list. For example, if the user recently bought a bicycle, he or she may not be interested in buying another bicycle for some time. The media guidance application may access a database of longevity of certain items, which may relate an item to the amount of time the item may last before the user may be interested in the item again. The media guidance application may be configured to select, as the object depicted in the video in which the user is interested, the candidate object having the highest rank.

In some embodiments, the media guidance application may be configured to identify a plurality of objects depicted in the frame that satisfy predetermined criteria. The predetermined criteria may include size, position, contrast relative to surrounding objects, or any other visual attribute. For example, the media guidance application may be configured to only identify objects which appear in the background of the frame or are otherwise too small or indistinct to be easily identified by the user. For example, if an object occupies an area of the frame that is less than a threshold percentage of the total area of the frame, such as five percent, the media guidance application may determine that the object is too small to be identified by the user. In the above example, the Tesla Model 3 may appear in the foreground of the frame. Therefore, the media guidance application may identify only bicycle 106, waterfall 108, and flock of birds 110. The media guidance application may compare each of the plurality of objects to a list of excluded objects. The list of excluded objects may include objects that are ubiquitous, such as clouds, grass, trees, and some common types of animals, as well as objects that may be considered "uninteresting" such as traffic lights, stop signs, tables, and chairs. For example, the media guidance application may be configured to exclude background animals which cannot be positively identified by species. The media guidance application may be configured to determine, based on the comparison, as the plurality of candidate objects, a subset of the plurality of objects which do not appear on the list of excluded objects. Continuing the above example, though the flock of birds may satisfy the predetermined criteria, they may not be identifiable as a particular species of bird. The coloration, markings, body shape, and other physical characteristics of the birds may not be depicted with enough clarity to identify, with a certain minimum threshold of accuracy, the particular species of bird. For example, the actual species of bird depicted in the frame may be crows. However, because the birds are depicted in the background, the media guidance application may not be able to distinguish the crows from other similar birds, such as ravens, blackbirds, and starlings. The media guidance application may therefore exclude it from the plurality of candidate objects.

In some embodiments, the media guidance application may be configured to receive, from the user input interface, during playback of the auxiliary video, a fast-forward command. The media guidance application may determine, in response to receiving the fast-forward command, that the user is not interested in the object depicted in the auxiliary video. Continuing the above example, the media guidance application may select bicycle 106 as the object in which the user is interested and generate for display auxiliary video describing bicycle 106. The user may not actually be interested in bicycle 106 and may choose to fast-forward through the auxiliary video describing bicycle 106. The media guidance application may be configured to determine, based on the user's fast-forward command during the auxiliary video, that the user is not interested in bicycle 106. In response to this determination, the media guidance application may be configured to remove the object from the ranked list. For example, if the user fast-forwarded through the bicycle auxiliary video, the media guidance application may remove bicycle 106 from the ranked list so that future auxiliary video presented to the user will not be video describing bicycle 106.

In some embodiments, the media guidance application may be configured to select a second object of the plurality of objects having a second-highest rank. For example, based on the user interest data, bicycle 106 may be the highest ranked object, and waterfall 108 may be the second-highest ranked object. The media guidance application may therefore select waterfall 108. The media guidance application may be configured to detect a third break during playback of the video and, in response to detecting the third break, may be configured to generate for display, during the third break, second auxiliary video describing the second object. For example, the media guidance application may detect another break point in the episode of "The Big Bang Theory" and generate for display, during that break, video describing waterfall 108.

In some embodiments, the media guidance application may be configured to assign, based on the rank, a weighting factor to each candidate object of the plurality of candidate objects. For example, the ranked list may include multiple objects, some of which have the same rank. The media guidance application may assign each object a weighting factor corresponding to its rank. The weighting factor may be a number between zero and one. For example, the Tesla Model 3 may be the highest-ranked object, and may be assigned a weighting factor of one. The next two objects in the ranked list may carry the same rank, and may therefore both be assigned a weighting factor of, for example, 0.5. The media guidance application may select an object of the plurality of objects based on the weighting factors. The weighting factor may be used to influence the frequency with which auxiliary video for each object in the ranked list is displayed. For example, the media guidance application may choose an object from the ranked list at random and present auxiliary video describing the chosen object. By using a weighting factor, the media guidance application may choose higher ranked objects more frequently than lower ranked objects. The media guidance application may be configured to detect a third break in the video and generate for display, during the third break, auxiliary video describing the selected object.

In some embodiments, the media guidance application may be configured to determine whether a threshold amount of time has passed since a candidate object was added to the ranked list. The ranked list may be maintained for a long period of time, and may include objects depicted in multiple frames. However, after a period of time, some objects that were highly ranked may become less important or less interesting to the user. In order to remove objects that may no longer interest the user from the ranked list, the media guidance application may record the time at which each object was added to the ranked list and compare the recorded time with the current time to determine if a threshold amount of time has passed. For example, the media guidance application may convert the recorded time and the current time to Universal Time Code ("UTC") integer values. The media guidance application may subtract the UTC integer value representing the recorded time from the UTC integer value representing the current time. If the difference between the two integers is greater than a threshold amount, the media guidance application may determine that the threshold amount of time has passed. In response to determining that the threshold amount of time has passed, the media guidance application may be configured to remove the candidate object from the ranked list.

In some embodiments, the media guidance application may be configured to receive from the user input interface, during playback of the video, a second rewind command. The media guidance application may be configured to perform a second rewind operation in response to the second rewind command. The media guidance application may be configured to determine an end point of the second rewind operation, and determine if the playback position reached during the second rewind operation is during a break in the video. If so, the media guidance application may be configured to process a second frame of the video at the playback position to identify a second plurality of candidate objects depicted in the frame. The media guidance application may be configured to search the database of videos and associated objects for each of the second plurality of objects, and identify a second plurality of candidate objects having an associated video. The media guidance application may be configured to access, from the profile associated with the user, user interest data. The media guidance application may be configured to retrieve metadata associated with each of the second plurality of candidate objects and compare the metadata of each of the plurality of candidate objects with the user interest data. The media guidance application may be configured to update the ranked list of the plurality of candidate objects based on this comparison. The media guidance application may further perform new comparisons of the objects already on the ranked list to determine a new ranking order for all objects. The media guidance application may be configured to select, as the object depicted in the video, a candidate object of the plurality of candidate objects having the highest rank.

In some embodiments, the media guidance application may be configured to store the ranked list in the profile associated with the user. The profile may be stored on a remote server or may be stored locally. The media guidance application may detect the user's presence at a second media device. For example, the user may log in to a second media device, to his or her personal computer, or his or her smartphone or tablet. The media guidance application may be configured to generate for display, on the second media device, auxiliary video describing the highest-ranked object. For example, if the user logs in to his or her smartphone, auxiliary video describing the highest-ranked object on the ranked list of objects may be displayed to the user at an appropriate time on the user's smartphone.

In some embodiments, the media guidance application may be configured to determine that a second user is co-located with the user. For example, the user and his or her friend may be watching the video together. The media guidance application may have access to a camera or other sensor which may be used to determine the presence of the second user. Alternatively, the media guidance application may detect a mobile device associated with each of the users, such as a smartphone, using near-field communications, IEEE 802.11 a/b/g/n ("WiFi"), Bluetooth, or any other suitable method of detection. The media guidance application may be configured to detect a negative reaction from the second user during playback of the auxiliary video. For example, during playback of the auxiliary video, the user's friend may make a verbal comment, frown, or otherwise indicate displeasure with the auxiliary content. The media guidance application may be configured to detect such reactions, such as through a camera or microphone connected to the media device. The media guidance application may be configured to prevent further display of the auxiliary video and begin monitoring the location of the second user. The media guidance application may be configured to detect that the second user is no longer co-located with the user. For example, using the camera, the media guidance application may detect that the user's friend is no longer watching with the user. The media guidance application may be configured to again generate for display to the user the auxiliary video.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
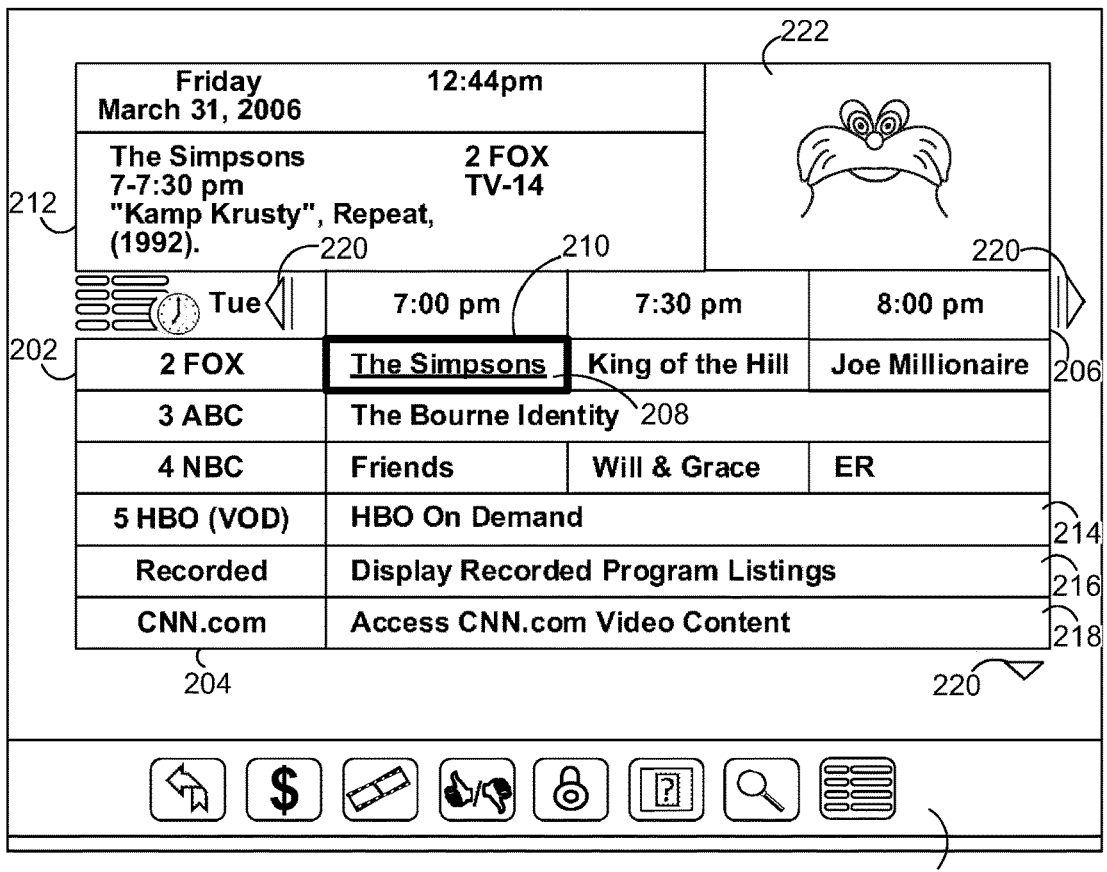
FIG. 2 shows an illustrative display screen that may be used to provide media guidance data according to an embodiment of the disclosure.
Figure 3:
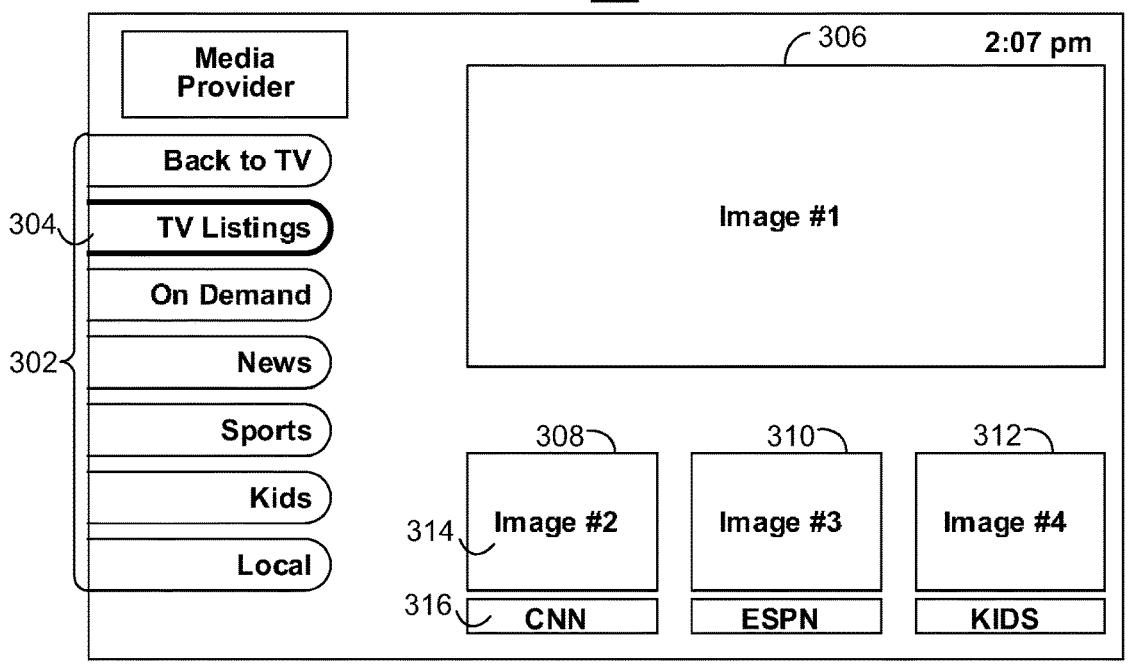
FIG. 3 shows an illustrative display screen that may be used to provide media guidance data according to an embodiment of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
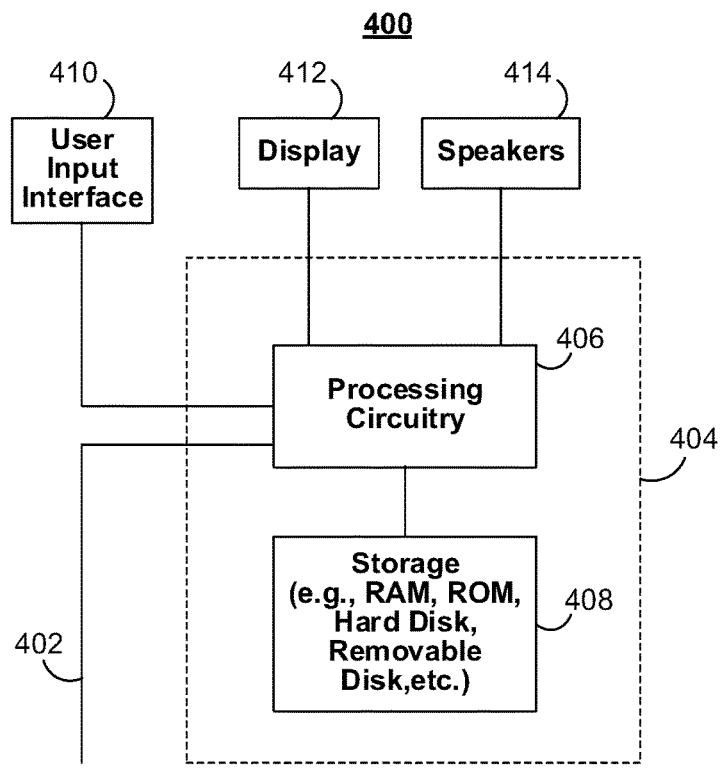
FIG. 4 shows a generalized embodiment of a stand-alone device according to an embodiment of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
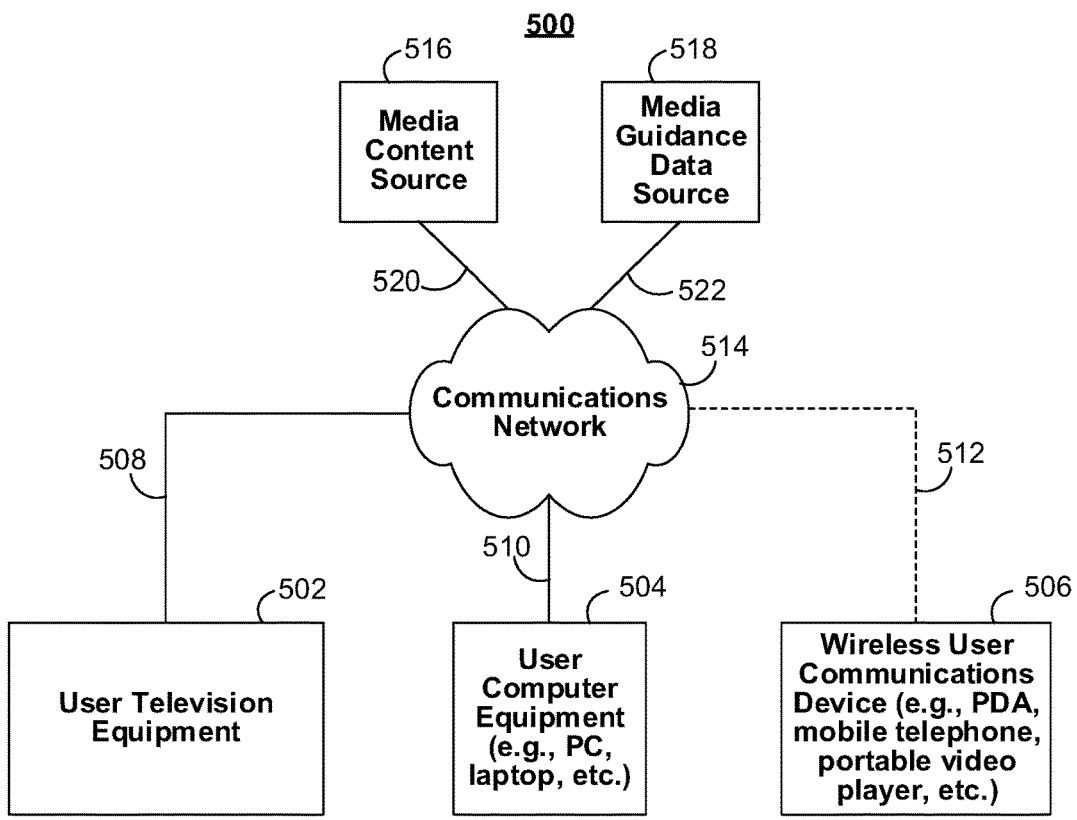
FIG. 5 shows a specific implementation of user devices according to an embodiment of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
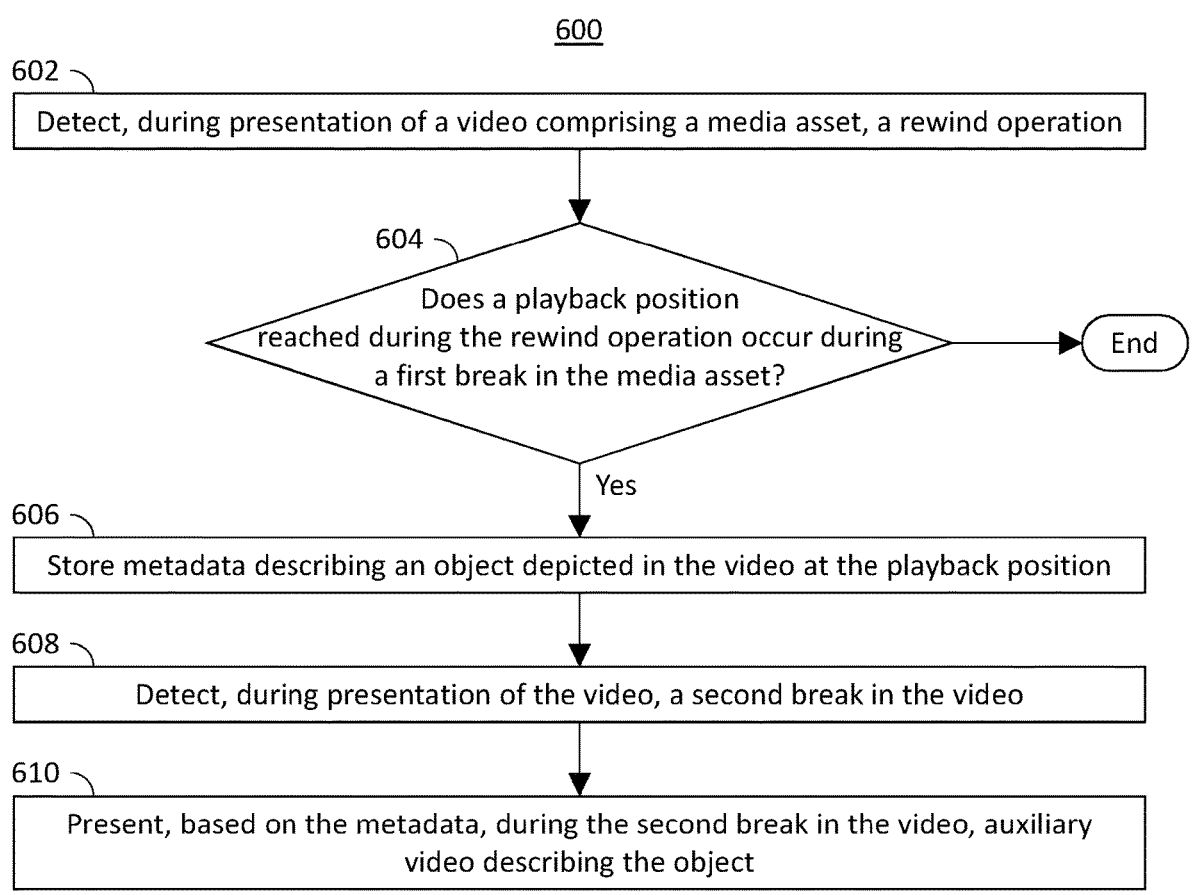
FIG. 6 is a flowchart representing a process for presenting, to a user, auxiliary video related to an object depicted in a video in which the user is interested according to an embodiment of the disclosure.

FIG. 6 is a flowchart representing an illustrative process for presenting, to a user, auxiliary video related to an object depicted in a video in which the user is interested in accordance with some embodiments of the disclosure. The flowchart in FIG. 6 represents a process 600 implemented on control circuitry 404 for presenting, to a user, auxiliary video related to an object depicted in a video in which the user is interested according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to present, to a user, auxiliary video related to an object depicted in a video in which the user is interested. In addition, one or more actions of process 600 may be incorporated into or combined with one or more actions of any other process or embodiment described herein.

At 602, control circuitry 404 may detect, during presentation of a video comprising a media asset, a rewind operation. For example, control circuitry 404 may periodically detect a timestamp of the video, or otherwise note the current playback position of the video. Control circuitry 404 may store the timestamp or playback position in a variable or other data structure in, for example, storage 408. Each time control circuitry 404 detects the timestamp or playback position, control circuitry 404 may compare the timestamp or playback position with the stored timestamp or playback position. If the current timestamp or playback position is earlier in the video than the stored timestamp or playback position, control circuitry 404 may determine that a rewind operation has occurred. Alternatively, control circuitry 404 may monitor user input interface 410 for commands received from a user input device.

At 604, control circuitry 404 may determine if a playback position reached during the rewind operation occurs during a first break in the media asset. For example, the video may comprise an episode of "The Big Bang Theory" which includes several break points at which advertisements may be inserted by broadcasters. Control circuitry 404 may determine, for example, based on metadata of the video, whether the playback position reached during the rewind operation falls within the content of the episode of the "The Big Bang Theory" or within a break point.

If the playback position reached during the rewind operation does occur during a first break in the media asset, then, at 606, control circuitry 404 may store metadata describing an object depicted in the video at the playback position. Control circuitry 404 may extract metadata or a subset of metadata from the video and store it in a data structure in, for example, storage 408.

At 608, control circuitry 404 may detect, during presentation of the video, a second break in the video. For example, the media guidance application may detect a second break point in the "The Big Bang Theory" media asset. The metadata of the video may indicate portions of the video containing content of the media asset and portions which contain content inserted by broadcasters, such as during an advertisement break in the media asset.

At 610, control circuitry 404 may present, based on the metadata, during the second break in the video, auxiliary video describing the object. For example, control circuitry 404 may select auxiliary content based on the stored metadata describing an object depicted in the frame reached during the rewind operation.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
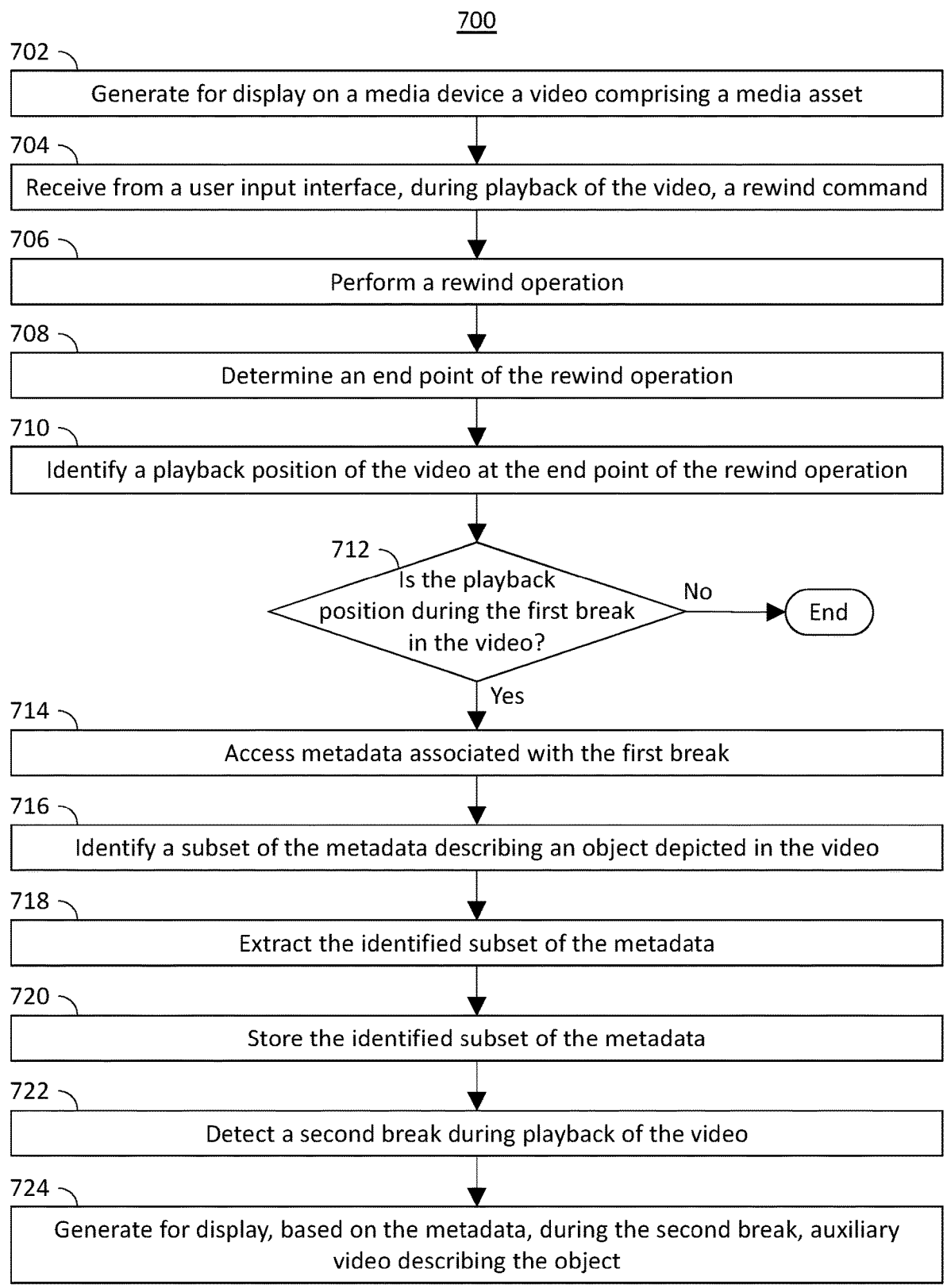
FIG. 7 is a flowchart representing a process for presenting, to a user, auxiliary video related to an object depicted in a video in which the user is interested according to an embodiment of the disclosure.

FIG. 7 is a flowchart representing an illustrative process for presenting, to a user, auxiliary video related to an object depicted in a video in which the user is interested in accordance with some embodiments of the disclosure. The flowchart in FIG. 7 represents a process 700 implemented on control circuitry 404 for presenting, to a user, auxiliary video related to an object depicted in a video in which the user is interested according to an embodiment of the disclosure. It should be noted that process 600 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to present, to a user, auxiliary video related to an object depicted in a video in which the user is interested. In addition, one or more actions of process 700 may be incorporated into or combined with one or more actions of any other process or embodiment described herein.

At 702, control circuitry 404 may generate for display on a media device a video comprising a media asset. For example, control circuitry 404 may generate for display video content comprising an episode of "The Big Bang Theory". The video may be generated for display from a broadcast stream received at the media device, or from a recording stored in a memory of the media device.

At 704, control circuitry 404 may receive from a user input interface, during playback of the video, a rewind command. The user input interface may be a remote control associated with the media device, a playback control application on a personal computing device such as a smartphone or tablet, or an on-screen playback control interface optionally displayed in an overlay over the video. For example, a user may press a rewind button on a remote control. As another example, a user may use an application on his or her smartphone, tablet, or other personal computing device to control playback of the video. As yet another example, the media device may be a smartphone or tablet with a touchscreen interface, and the user input interface may be displayed in an overlay over the video when the user touches the screen. The user may then control playback by tapping a rewind icon, or by interacting with a progress bar representing the user's progress through the video, such as that displayed in overlay 102.

At 706, control circuitry 404 may perform a rewind operation. The rewind command may specify a specific point within the video to which the user wants to return. For example, the user may tap a specific point on the progress bar displayed in overlay 102, or may drag a pointer along the progress bar to a specific point. Alternatively, the rewind command may be an open-ended command, requiring a further command from the user input interface to terminate the rewind operation and/or resume playback of the video. For example, the user may press a rewind button on the user input interface, causing the media device to rewind through video until a stop or play command is received.

At 708, control circuitry 404 may determine an end point of the rewind operation. For example, if the rewind command specifies a specific point within the video to which the user wants to return, control circuitry 404 may extract from the rewind command data indicating the specified point. For example, the rewind command may include a timestamp or other indication of the point to which the user wishes to return. Alternatively, if the rewind command is open-ended, control circuitry 404 may determine the end point of the rewind operation to be the point reached by control circuitry 404 in performing the rewind operation at the time the command to terminate the rewind operation was received.

At 710, control circuitry 404 may identify a playback position of the video at the end point of the rewind operation. For example, control circuitry 404 may determine from metadata of the video a timestamp thereof at the point at which the rewind command was terminated.

At 712, control circuitry 404 may determine whether the playback position reached during the rewind operation occurs during the first break in the video. For example, the video may comprise an episode of "The Big Bang Theory" which includes several break points at which advertisements may be inserted by broadcasters. Control circuitry 404 may determine, for example, based on metadata of the video, whether the playback position reached during the rewind operation falls within the content of the episode of the "The Big Bang Theory" or within a break point.

If the playback position reached during the rewind operation does occur during the first break in the video then, at 714, control circuitry 404 may access metadata associated with the first break. Control circuitry 404 may access the video and located metadata within video. For example, if the video is encapsulated in an MPEG-2 transport stream, control circuitry 404 may access packet headers and other metadata structures within the transport stream containing metadata relating to the first break.

At 716, control circuitry 404 may identify a subset of the metadata describing an object depicted in the video. For example, control circuitry 404 may identify metadata fields relating to multimedia properties such as resolution, aspect ratio, and audio sampling rate, and metadata fields relating to video content, such as descriptions, actors, and titles. Control circuitry 404 may determine that the metadata fields relating to video content describe the object depicted in the video.

At 718, control circuitry 404 may extract the identified subset of the metadata. For example, control circuitry 404 may copy the metadata related to the video content.

At 720, control circuitry 404 may store the identified set of metadata. For example, control circuitry 404 may store the metadata relating to video content in a storage device accessible by control circuitry 404, such as storage 408.

At 722, control circuitry 404 may detect a second break during playback of the video. For example, the media guidance application may detect a second break point in the "The Big Bang Theory" media asset.

At 724, control circuitry 404 may generate for display, based on the metadata, during the second break, auxiliary video describing the object. For example, control circuitry 404 may generate for display video content describing the object in which the user is interested during the second break point.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 7.

Figure 8:
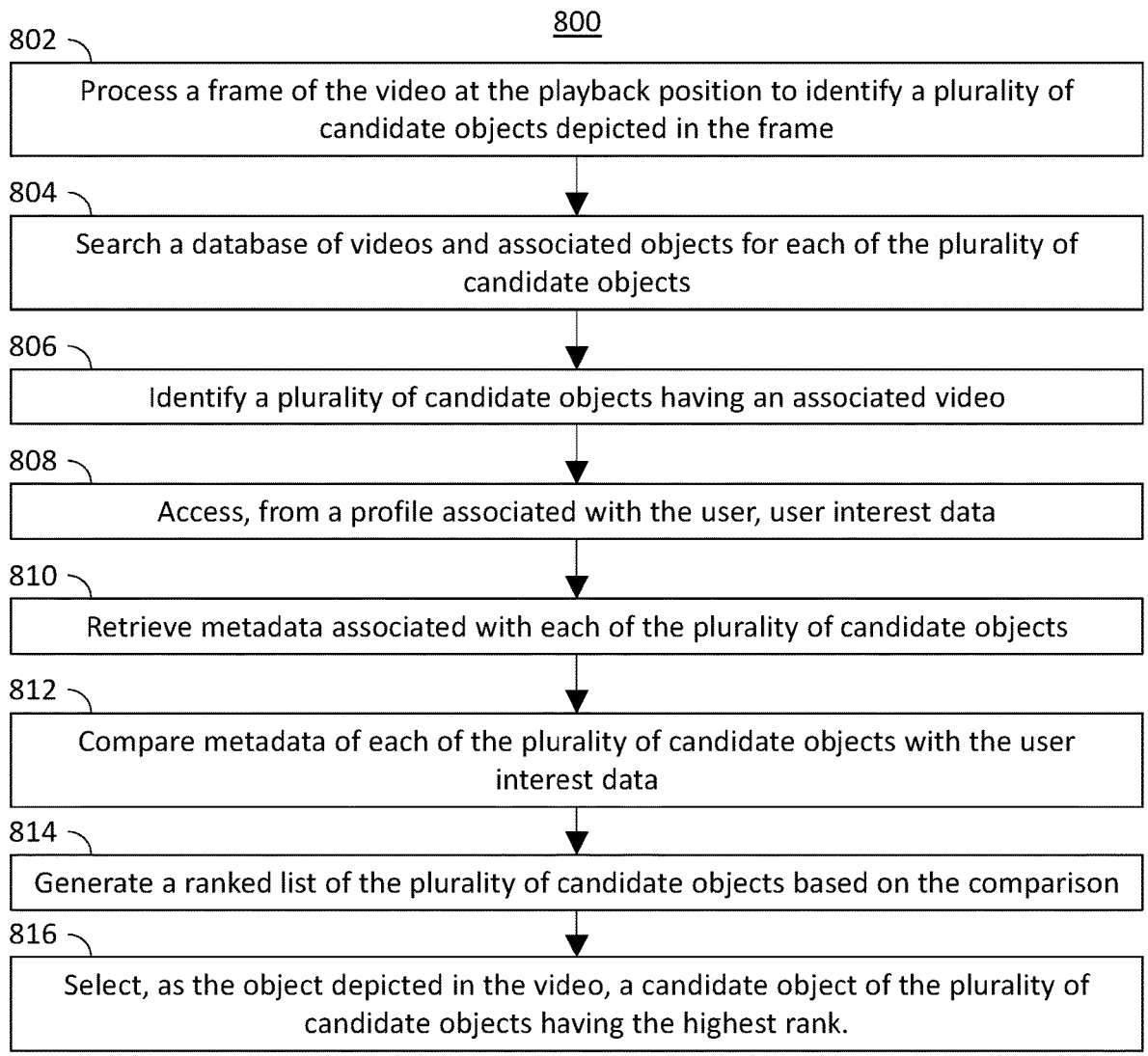
FIG. 8 is a flowchart representing a process for selecting the object in which the user is interested from a ranked list according to an embodiment of the disclosure.

FIG. 8 is a flowchart representing an illustrative process selecting the object in which the user is interested from a ranked list in accordance with some embodiments of the disclosure. The flowchart in FIG. 8 represents a process 800 implemented on control circuitry 404 for selecting the object in which the user is interested from a ranked list according to an embodiment of the disclosure. It should be noted that process 800 or any action thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to select the object in which the user is interested from a ranked list. In addition, one or more actions of process 800 may be incorporated into or combined with one or more actions of any other process or embodiment described herein.

At 802, control circuitry 404 may process a frame of the video at the playback position to identify a plurality of candidate objects depicted in the frame. For example, control circuitry 404 may use edge detection, pattern recognition, optical character recognition, predetermined object locations, or any other suitable technique or method to identify several objects included in the frame 100. For example, control circuitry 404 may detect the edges of an object by analyzing the relative brightness of adjacent pixels in the frame, where a threshold change in brightness indicates the edge of an object, or may compare detected shapes with known text characters to identify specific words depicted in the frame. Control circuitry 404 may identify car 104, bicycle 106, waterfall 108, and flock of birds 110. Control circuitry 404 may perform image analysis on each object detected to determine the identity of each object.

At 804, control circuitry 404 may search a database of videos and associated objects for each of the plurality of candidate objects. For example, control circuitry 404 may access a database which relates at least one video with each of a number of objects. For example, if a specific make and model of car 104, such as a Tesla Model 3, is depicted in the frame, control circuitry 404 may search the database for videos associated with a Tesla Model 3.

At 806, control circuitry 404 may identify a plurality of candidate objects having an associated video. For example, several objects may be depicted in the frame along with the Tesla Model 3, such as bicycle 106, waterfall 108, and flock of birds 110. Control circuitry 404 may search the database for videos related to each of these objects, and identify videos related to the Tesla Model 3, bicycles, and waterfalls, but may find no videos related to a flock of birds.

At 808, control circuitry 404 may access, from a profile associated with the user, user interest data. For example, the user interest data may include the user's social media activity, online search history, online purchase history, and other personal data indicative of the user's interests. Control circuitry 404 may connect to the user's social media accounts and may generate and maintain a database of the user's social media activity. Control circuitry 404 may also connect to the user's online purchase accounts, such as those from Amazon and Ebay, and generate and maintain a database of the user's online purchase activity.

At 810, control circuitry 404 may retrieve metadata associated with each of the plurality of candidate objects. For example, the media guidance application may retrieve metadata relating to the Tesla Model 3 such as the type of vehicle (e.g., sedan) and fuel type (e.g., electric).

At 812, control circuitry 404 may compare metadata of each of the plurality of candidate objects with the user interest data. For example, the user interest data may indicate that the user has been searching for an electric car. The user interest data may further indicate that the user recently purchased a bicycle and has searched for images of waterfalls periodically over the past six months.

At 814, control circuitry 404 may generate a ranked list of the plurality of candidate objects based on the comparison. For example, if the user has recently been searching for electric cars, control circuitry 404 may place the Tesla Model 3 as the top ranked candidate object. Alternatively, if the user has searched for electric cars more than a threshold number of times within a period of time, control circuitry 404 may place the Tesla Model 3 as the top ranked candidate object. If the user has occasionally searched for a bicycle or bought a bicycle a long time ago, control circuitry 404 may place the bicycle in a lower-ranked position in the list. For example, if the user recently bought a bicycle, he or she may not be interested in buying another bicycle for some time. Control circuitry 404 may access a database of longevity of certain items, which may relate an item to the amount of time the item may last before the user may be interested in the item again. If a candidate object is an item with a long life and user interest data shows the user purchased the item recently, control circuitry 404 may place it at a lower ranked position. If a candidate object is an item with a short life, control circuitry 404 may place it at a higher ranked position.

At 816, control circuitry 404 may select, as the object depicted in the video, a candidate object of the plurality of candidate objects having the highest rank.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 8.

Figure 9:
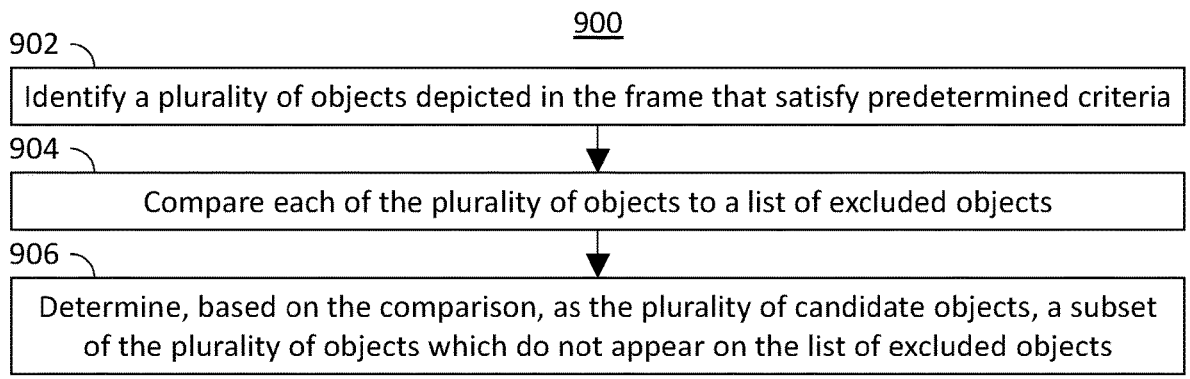
FIG. 9 is a flowchart representing a process for processing a frame of video to identify candidate objects depicted in the frame according to an embodiment of the disclosure.

FIG. 9 is a flowchart representing an illustrative process for processing a frame of video to identify candidate objects depicted in the frame in accordance with some embodiments of the disclosure. The flowchart in FIG. 9 represents a process 900 implemented on control circuitry 404 for processing a frame of video to identify candidate objects depicted in the frame according to an embodiment of the disclosure. It should be noted that process 900 or any action thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506

(FIG. 5)) in order to process a frame of video to identify candidate objects depicted in the frame. In addition, one or more actions of process 900 may be incorporated into or combined with one or more actions of any other process or embodiment described herein.

At 902, control circuitry 404 may identify a plurality of objects depicted in the frame that satisfy predetermined criteria. The predetermined criteria may include size, position, contrast relative to surrounding objects, or any other visual attribute. For example, control circuitry 404 may be configured to only identify objects which appear in the background of the frame, or are otherwise too small or indistinct to be easily identified by the user. In the above example, the Tesla Model 3 may appear in the foreground of the frame. Therefore, control circuitry 404 may identify only bicycle 106, waterfall 108, and flock of birds 110.

At 904, control circuitry 404 may compare each of the plurality of objects to a list of excluded objects. The list of excluded objects may include objects that are ubiquitous, such as clouds, grass, trees, and some common types of animals, as well as objects that may be considered "uninteresting" such as traffic lights, stop signs, tables, and chairs. For example, control circuitry 404 may be configured to exclude background animals which cannot be positively identified by species.

At 906, control circuitry 404 may determine, based on the comparison, as the plurality of candidate objects, a subset of the plurality of objects which do not appear on the list of excluded objects. Continuing the above example, though the flock of birds may satisfy the predetermined criteria, they cannot be identified as a particular species of bird. Control circuitry 404 may therefore exclude it from the plurality of candidate objects.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
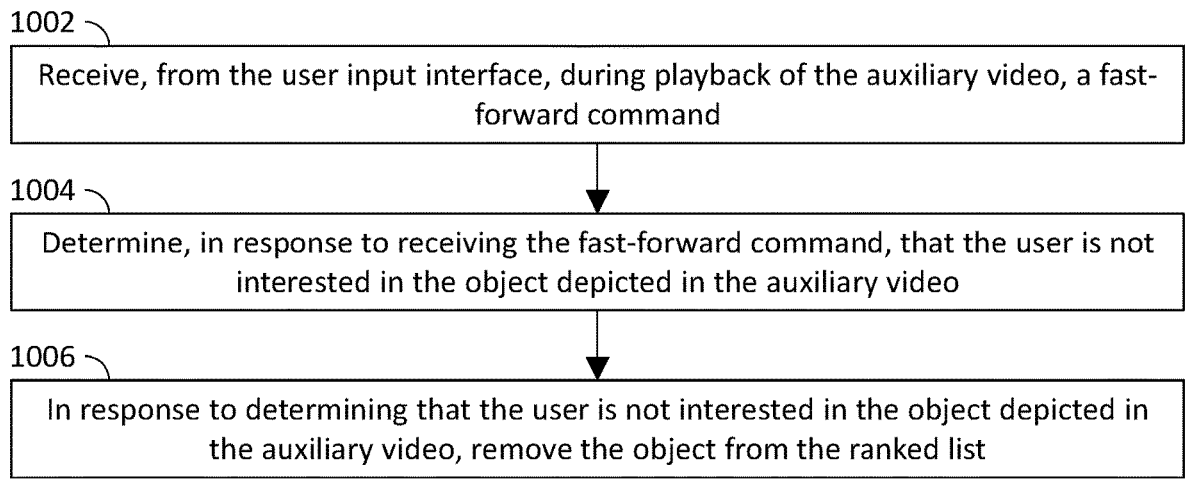
FIG. 10 is a flowchart representing a process for removing an object from a ranked list of objects according to an embodiment of the disclosure.

FIG. 10 is a flowchart representing an illustrative process for removing an object from a ranked list of objects in accordance with some embodiments of the disclosure. The flowchart in FIG. 10 represents a process 1000 implemented on control circuitry 404 for removing an object from a ranked list of objects according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to remove an object from a ranked list of objects. In addition, one or more actions of process 1000 may be incorporated into or combined with one or more actions of any other process or embodiment described herein.

At 1002, control circuitry 404 may receive, from the user input interface, during playback of the auxiliary video, a fast forward command. Control circuitry 404 may receive the fast-forward command similar to the rewind command as described above.

At 1004, control circuitry 404 may determine, in response to receiving the fast-forward command, that the user is not interested in the object depicted in the auxiliary video. Continuing the above example, control circuitry 404 may select bicycle 106 as the object in which the user is interested and generate for display auxiliary video describing bicycle 106. The user may not actually be interested in bicycle 106 and may choose to fast-forward through the auxiliary video describing bicycle 106. Control circuitry 404 may be configured to determine, based on the user's fast-forward command during the auxiliary video, that the user is not interested in bicycle 106.

At 1006, in response to determining that the user is not interested in the object depicted in the auxiliary video, control circuitry 404 may remove the object from the ranked list. Control circuitry 404 may also update the ranks of the remaining items in the ranked list to reflect the removal of the object.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

Figure 11:
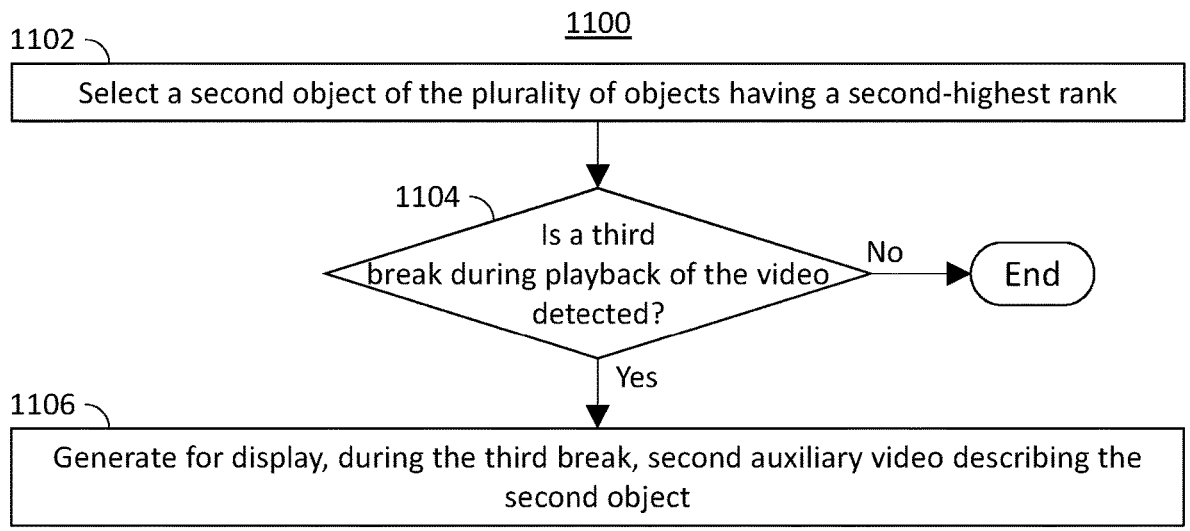
FIG. 11 is a flowchart representing a process for generating for display second auxiliary video describing a second object according to an embodiment of the disclosure.

FIG. 11 is a flowchart representing an illustrative process for generating for display second auxiliary video describing a second object in accordance with some embodiments of the disclosure. The flowchart in FIG. 11 represents a process 1100 implemented on control circuitry 404 for generating for display second auxiliary video describing a second object according to an embodiment of the disclosure. It should be noted that process 1100 or any action thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to generate for display second auxiliary video describing a second object. In addition, one or more actions of process 1100 may be incorporated into or combined with one or more actions of any other process or embodiment described herein.

At 1102, control circuitry 404 may select a second object of the plurality of objects having a second-highest rank. For example, the based on the user interest data, bicycle 106 may be the highest ranked object, and waterfall 108 may be the second-highest ranked object. Control circuitry 404 may therefore select waterfall 108.

At 1104, control circuitry may detect a third break during playback of the video. This may be accomplished using the methods described above in relation to FIG. 7.

At 1106, in response to detecting the third break, control circuitry 404 may generate for display, during the third break, second auxiliary video describing the second object. This may be accomplished using the methods described above in relation to FIG. 7.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 11.

Figure 12:
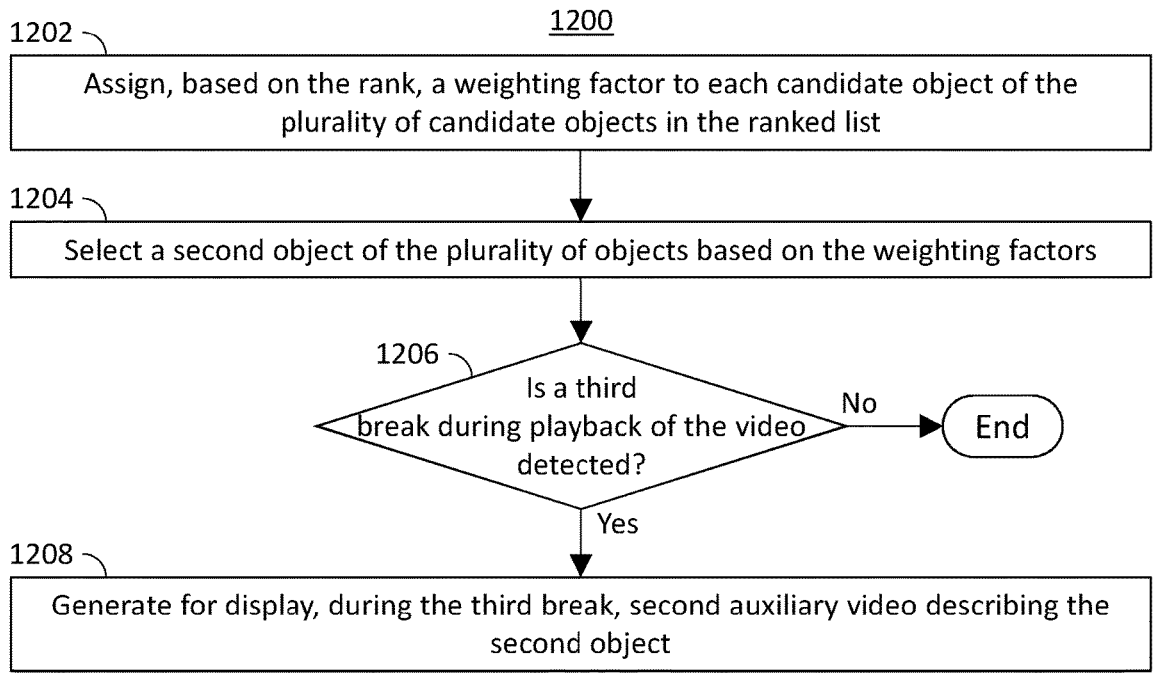
FIG. 12 is a flowchart representing a process for generating for display second auxiliary video describing a second object according to an embodiment of the disclosure.

FIG. 12 is a flowchart representing an illustrative process for generating for display second auxiliary video describing a second object in accordance with some embodiments of the disclosure. The flowchart in FIG. 12 represents a process 1200 implemented on control circuitry 404 for generating for display second auxiliary video describing a second object according to an embodiment of the disclosure. It should be noted that process 1200 or any action thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to generate for display second auxiliary video describing a second object. In addition, one or more actions of process 1200 may be incorporated into or combined with one or more actions of any other process or embodiment described herein.

At 1202, control circuitry 404 may assign, based on the rank, a weighting factor to each candidate object of the plurality of candidate objects. For example, the ranked list may include multiple objects, some of which have the same rank. Control circuitry 404 may assign each object a weighting factor corresponding to its rank. The weighting factor may be a number between zero and one. For example, the Tesla Model 3 may be the highest-ranked object, and may be assigned a weighting factor of one. The next two objects in the ranked list may carry the same rank, and may therefore both be assigned a weighting factor of, for example, 0.5.

At 1204, control circuitry 404 may select a second object of the plurality of objects based on the weighting factors. The weighting factor may be used to influence the frequency with which auxiliary video for each object in the ranked list is displayed. For example, control circuitry 404 may choose an object from the ranked list at random and present auxiliary video describing the chosen object. By using a weighting factor, control circuitry 404 may choose higher ranked objects more frequently than lower ranked objects.

At 1206, control circuitry 404 may detect a third break during playback of the video. This may be accomplished using the methods described above in relation to FIG. 7.

At 1208, in response to detecting the third break, control circuitry 404 may generate for display, during the third break, second auxiliary video describing the second object. This may be accomplished using the methods described above in relation to FIG. 7.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 12.

Figure 13:
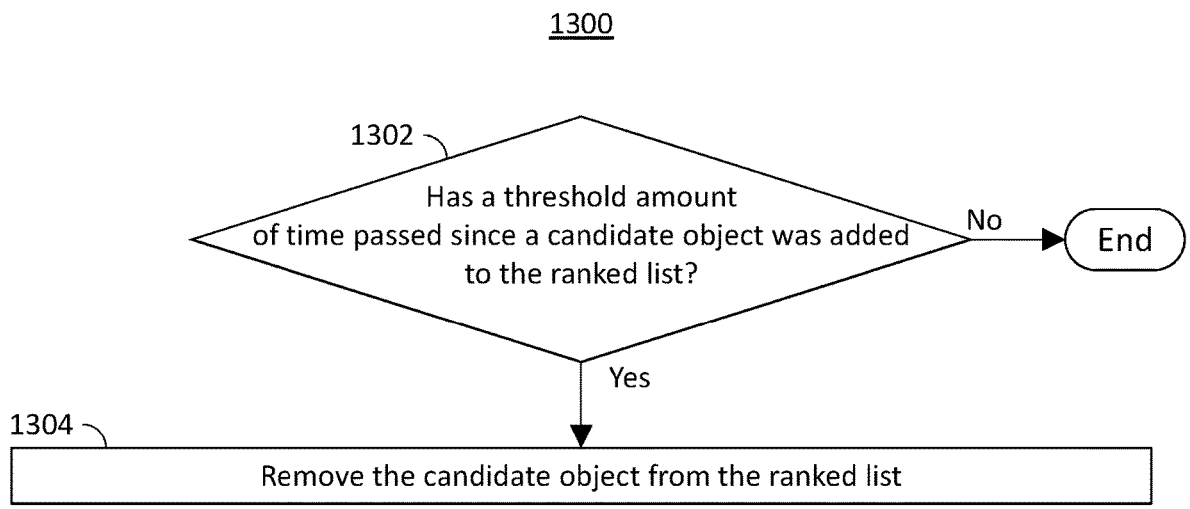
FIG. 13 is a flowchart representing a process for removing an object from a ranked list of objects according to an embodiment of the disclosure.

FIG. 13 is a flowchart representing an illustrative process for removing an object from a ranked list of objects in accordance with some embodiments of the disclosure. The flowchart in FIG. 13 represents a process 1300 implemented on control circuitry 404 for removing an object from a ranked list of objects according to an embodiment of the disclosure. It should be noted that process 1300 or any action thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5)) in order to remove an object from a ranked list of objects. In addition, one or more actions of process 1300 may be incorporated into or combined with one or more actions of any other process or embodiment described herein.

At 1302, control circuitry 404 may determine whether a threshold amount of time has passed since a candidate object was added to the ranked list. The ranked list may be maintained for a long period of time, and may include objects depicted in multiple frames. However, after a period of time, some objects that were highly ranked may become less important or less interesting to the user. In order to remove objects that may no longer interest the user from the ranked list, control circuitry 404 may record the time at which each object was added to the ranked list and compare the recorded time with the current time to determine if a threshold amount of time has passed. For example, control circuitry 404 may convert the recorded time and the current time to Universal Time Code ("UTC") integer values. Control circuitry 404 may subtract the UTC integer value representing the recorded time from the UTC integer value representing the current time. If the difference between the two integers is greater than a threshold amount, control circuitry 404 may determine that the threshold amount of time has passed.

At 1304, in response to determining that the threshold amount of time has passed, control circuitry 404 may remove the candidate object from the ranked list. Control circuitry 404 may also update the ranks of the remaining items in the ranked list to reflect the removal of the object.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 13.

Figure 14:
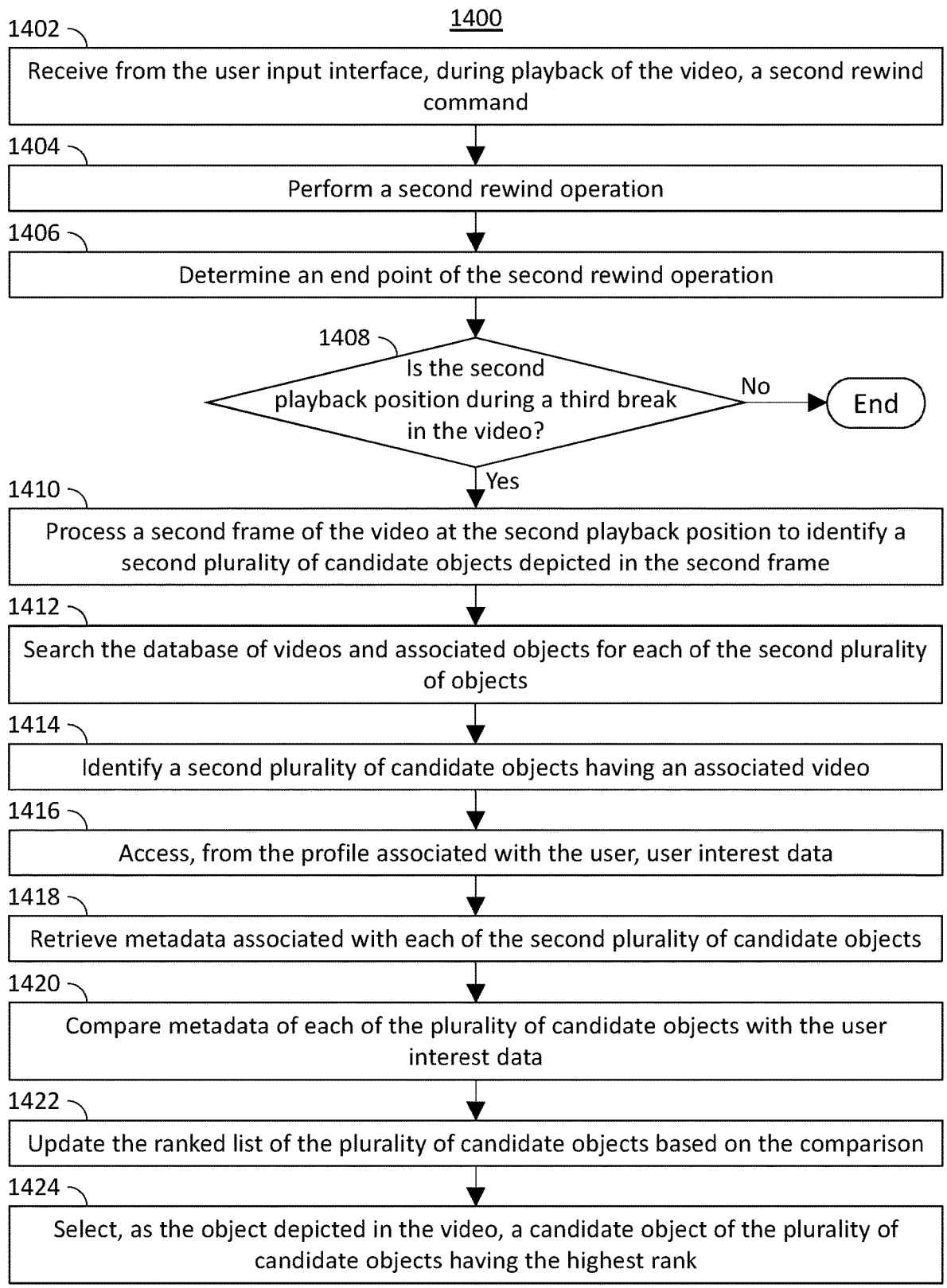
FIG. 14 is a flowchart representing a process for selecting the object in which the user is interested from an updated ranked list according to an embodiment of the disclosure.

FIG. 14 is a flowchart representing an illustrative process for selecting the object in which the user is interested from an updated ranked list in accordance with some embodiments of the disclosure. The flowchart in FIG. 14 represents a process 1400 implemented on control circuitry 404 for selecting the object in which the user is interested from an updated ranked list according to an embodiment of the disclosure. It should be noted that process 1400 or any action thereof could be performed on, or provided by, any of the devices shown in FIGS. 4-5. For example, process 1400 may be executed by control circuitry 404 (FIG. 4) as instructed by a media guidance application implemented on a user device (e.g., user equipment devices 502, 504, and/or 506 (FIG. 5)) in order to select the object in which the user is interested from an updated ranked list. In addition, one or more actions of process 1400 may be incorporated into or combined with one or more actions of any other process or embodiment described herein.

At 1402, control circuitry 404 may receive from the user input interface, during playback of the video, a second rewind command. At 1404, control circuitry 404 may perform a second rewind operation. At 1406, control circuitry 404 may determine an end point of the second rewind operation. At 1408, control circuitry 404 may determine if the second playback position reached during the second rewind operation occurs during a third break in the video. At 1410, if the second playback position does occur during the third break in the video, control circuitry 404 may process a second frame of the video at the second playback position to identify a second plurality of candidate objects depicted in the second frame. At 1412, control circuitry 404 may search the database of videos and associated objects for each of the second plurality of objects. At 1414, control circuitry 404 may identify a second plurality of candidate objects having an associated video. At 1416, control circuitry 404 may access, from the profile associated with the user, the user interest data. At 1418, control circuitry 404 may retrieve metadata associated with each of the second plurality of candidate objects. At 1420, control circuitry may compare metadata of each of the plurality of candidate objects based on the comparison. The above actions may be accomplished using the methods described above with relation to FIG. 7.

At 1422, control circuitry 404 may update the ranked list of the plurality of candidate objects based on the comparison. Control circuitry 404 may further perform new comparisons of the objects already on the ranked list to determine a new ranking order for all objects.

At 1424, control circuitry 404 may select, as the object depicted in the video, a candidate object of the plurality of candidate objects having the highest rank.

It is contemplated that the actions or descriptions of FIG. 14 may be used with any other embodiment of this disclosure. In addition, the actions and descriptions described in relation to FIG. 14 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process.

Furthermore, it should be noted that any of the devices or equipment discussed in relation to FIGS. 4-5 could be used to perform one or more of the actions in FIG. 14.

Figure 15:
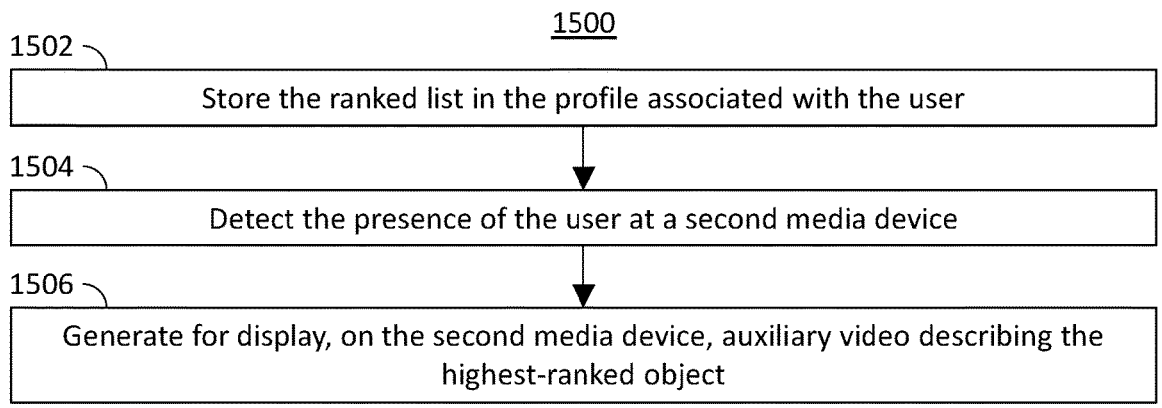
FIG. 15 is a flowchart representing a process for generating for display auxiliary video describing an object on a second media device according to an embodiment of the disclosure.

FIG. 15 is a flowchart representing an illustrative process for generating for display auxiliary video describing an object on a second media device in accordance with some embodiments of the disclosure. The flowchart in FIG. 15 represents a process 1500 implemented on control circuitry 404 for generating for display auxiliary video describing an object on a second media device according to an embodiment of the disclosure. It should be noted that process 1500 or any action thereof could be performed on, or provided by, any of the devices shown in FIGS. 4-5. For example, process 1500 may be executed by control circuitry 404 (FIG. 4) as instructed by a media guidance application implemented on a user device (e.g., user equipment devices 502, 504, and/or 506 (FIG. 5)) in order to generate for display auxiliary video describing an object on a second media device. In addition, one or more actions of process 1500 may be incorporated into or combined with one or more actions of any other process or embodiment described herein.

At 1502, control circuitry 404 may store the ranked list in the profile associated with the user. The profile may be stored on a remote server or may be stored locally. Control circuitry 404 may store the ranked list as a database, flat file, or other data structure in storage 408, or on a remote server such as media guidance data source 518.

At 1504, control circuitry 404 may detect the presence of the user at a second media device. For example, the user may log in to a second media device, to his or her personal computer, or his or her smartphone or tablet.

At 1506, control circuitry 404 may generate for display, on the second media device, auxiliary video describing the highest-ranked object. For example, if the user logs in to his or her smartphone, auxiliary video describing the highest-ranked object on the ranked list of objects may be displayed to the user at an appropriate time on the user's smartphone.

It is contemplated that the actions or descriptions of FIG. 15 may be used with any other embodiment of this disclosure. In addition, the actions and descriptions described in relation to FIG. 15 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 15.

Figure 16:
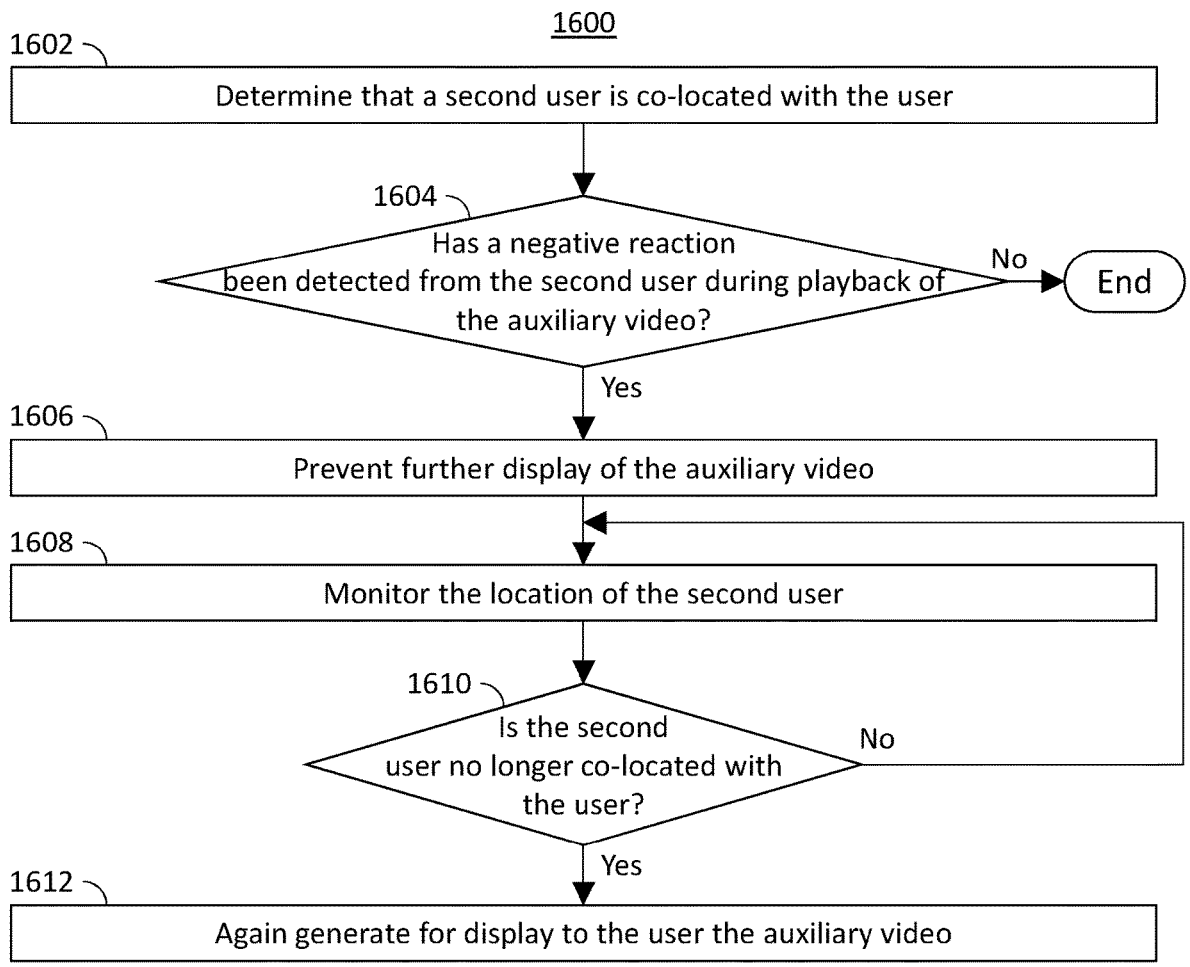
FIG. 16 is a flowchart representing a process for preventing display of an auxiliary video while a second user is present according to an embodiment of the disclosure.

FIG. 16 is a flowchart representing an illustrative process for preventing display of an auxiliary video while a second user is present in accordance with some embodiments of the disclosure. The flowchart in FIG. 16 represents a process 1600 implemented on control circuitry 404 for preventing display of an auxiliary video while a second user is present according to an embodiment of the disclosure. It should be noted that process 1600 or any action thereof could be performed on, or provided by, any of the devices shown in FIGS. 4-5. For example, process 1600 may be executed by control circuitry 404 (FIG. 4) as instructed by a media guidance application implemented on a user device (e.g., user equipment devices 502, 504, and/or 506 (FIG. 5)) in order to prevent display of an auxiliary video while a second user is present. In addition, one or more actions of process 1600 may be incorporated into or combined with one or more actions of any other process or embodiment described herein.

At 1602, control circuitry 404 may determine that a second user is co-located with the user. For example, the user and his or her friend may be watching the video together. Control circuitry 404 may have access to a camera, or other sensor which may be used to determine the presence of the second user. Alternatively, control circuitry 404 may detect a mobile device associated with each of the users, such as a smartphone, using near-field communications, IEEE 802.11 a/b/g/n ("WiFi"), Bluetooth, or any other suitable method of detection.

At 1604, control circuitry 404 may determine if a negative reaction has been detected during playback of the auxiliary video. For example, during playback of the auxiliary video, the user's friend may make a verbal comment, frown, or otherwise indicate displeasure with the auxiliary content. Control circuitry 404 may be configured to detect such reactions, such as through a camera or microphone connected to the media device. Video captured by the camera may be processed by control circuitry 404 to identify negative physical reactions. For example, the shape of the second user's mouth may be tracked to detect a frown. Audio captured by the microphone may be processed by control circuitry 404 using speech recognition to identify negative verbal reactions.

At 1606, if a negative reaction has been detected, control circuitry 404 may prevent further display of the auxiliary video. For example, control circuitry 404 may interrupt the processes used to generate the auxiliary video for display. Such processes may be linked to the value of a particular variable such as a Boolean variable. When the value of the Boolean variable is TRUE, control circuitry generates auxiliary video as normal. When the negative reaction is detected, control circuitry may change the value of the Boolean variable to FALSE, suspending the processes used to generate the auxiliary video.

At 1608, control circuitry 404 may begin monitoring the location of the second user. For example, control circuitry 404 may use the camera to detect whether the second user is still in the vicinity of the media device. Alternatively, control circuitry 404 may monitor the connection to the mobile device of the second user and detect if the connection is dropped.

At 1610, control circuitry may determine whether the second user is no longer co-located with the user. For example, using the camera, control circuitry 404 may detect that the user's friend is no longer watching with the user. Alternatively, control circuitry 404 may detect that the connection to the mobile device of the second user was dropped.

At 1612, in response to determining that the second user is no longer co-located with the user, control circuitry 404 may again generate for display to the user the auxiliary video.

It is contemplated that the actions or descriptions of FIG. 16 may be used with any other embodiment of this disclosure. In addition, the actions and descriptions described in relation to FIG. 16 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 16.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting, to a user, auxiliary video related to an object in which the user is interested, the object having been depicted in a video, the method comprising:
   generating for display, using control circuitry, on a media device the video comprising a media asset;
   receiving from a user input interface, during playback of the video, a rewind command;
   in response to receiving the rewind command, performing a rewind operation;
   determining an end point of the rewind operation;
   identifying a playback position of the video at the end point of the rewind operation;
   determining whether the playback position is during a first break in the video;
   in response to determining that the playback position is during the first break in the video:
      accessing metadata associated with the first break;
      identifying a subset of the metadata describing an object depicted in the video;
      extracting the identified subset of the metadata; and
      storing the identified subset of the metadata;
   detecting a second break during playback of the video;
   in response to detecting the second break, generating for display, based on the metadata, during the second break, the auxiliary video describing the object;
   determining that a second user is co-located with the user;
   detecting, during playback of the auxiliary video, a negative reaction of the second user; and
   in response to detecting the negative reaction:
      prevent further display of the auxiliary video;
      monitoring the location of the second user;
      determining that the second user is no longer co-located with the user; and
      again generating for display to the user the auxiliary video.

2. The method of claim 1, further comprising, further in response to determining that the playback position is during the first break in the video:
   processing a frame of the video at the playback position to identify a plurality of candidate objects depicted in the frame;
   searching a database of videos and associated objects for each of the plurality of candidate objects;
   identifying a plurality of candidate objects having an associated video;
   accessing, from a profile associated with the user, user interest data;
   retrieving metadata associated with each of the plurality of candidate objects;
   comparing metadata of each of the plurality of candidate objects with the user interest data;
   generating a ranked list of the plurality of candidate objects based on the comparison; and
   selecting, as the object depicted in the video, a candidate object of the plurality of candidate objects having the highest rank.

3. The method of claim 2, wherein processing the frame of the video at the playback position to identify a plurality of candidate objects depicted in the frame further comprises:
   identifying a plurality of objects depicted in the frame that satisfy predetermined criteria;
   comparing each of the plurality of objects to a list of excluded objects; and determining, based on the comparison, as the plurality of candidate objects, a subset of the plurality of objects which do not appear on the list of excluded objects.

4. The method of claim 2, further comprising:
receiving, from the user input interface, during playback of the auxiliary video, a fast-forward command;
determining, in response to receiving the fast-forward command, that the user is not interested in the object depicted in the auxiliary video; and
in response to determining that the user is not interested in the object depicted in the auxiliary video, removing the object from the ranked list.

5. The method of claim 4, further comprising:
selecting a second object of the plurality of objects having a second-highest rank;
detecting a third break during playback of the video; and
in response to detecting the third break, generating for display, during the third break, second auxiliary video describing the second object.

6. The method of claim 2, further comprising:
assigning, based on the rank, a weighting factor to each candidate object of the plurality of candidate objects in the ranked list;
selecting a second object of the plurality of objects based on the weighting factors;
detecting a third break during playback of the video; and
in response to detecting the third break, generating for display, during the third break, second auxiliary video describing the second object.

7. The method of claim 2, further comprising:
determining whether a threshold amount of time has passed since a candidate object was added to the ranked list; and
in response to determining that the threshold amount of time has passed, removing the candidate object from the ranked list.

8. The method of claim 2, further comprising:
receiving from the user input interface, during playback of the video, a second rewind command;
in response to receiving the second rewind command, performing a second rewind operation;
determining an end point of the second rewind operation;
identifying a second playback position of the video at the end point of the second rewind operation;
determining whether the second playback position is during a third break in the video; and
in response to determining that the second playback position is during the third break in the video:
processing a second frame of the video at the second playback position to identify a second plurality of candidate objects depicted in the second frame;
searching the database of videos and associated objects for each of the second plurality of candidate objects;
identifying a second plurality of candidate objects having an associated video;
accessing, from the profile associated with the user, user interest data;
retrieving metadata associated with each of the second plurality of candidate objects;
comparing metadata of each of the plurality of candidate objects with the user interest data;
updating the ranked list of the plurality of candidate objects based on the comparison; and
selecting, as the object depicted in the video, a candidate object of the plurality of candidate objects having the highest rank.

9. The method of claim 2, further comprising:
storing the ranked list in the profile associated with the user;
detecting the presence of the user at a second media device; and
generating for display, on the second media device, auxiliary video describing the highest-ranked object.

10. A system for presenting, to a user, auxiliary video related to an object in which the user is interested, the object having been depicted in a video, the system comprising:
user input interface circuitry;
communications circuitry; and
control circuitry configured to:
generate for display on a media device the video comprising a media asset;
receive, using the user input interface circuitry, during playback of the video, a rewind command;
in response to receiving the rewind command, perform a rewind operation;
determine an end point of the rewind operation;
identify a playback position of the video at the end point of the rewind operation;
determine whether the playback position is during a first break in the video;
in response to determining that the playback position is during the first break in the video:
access, using the communications circuitry, metadata associated with the first break;
identify a subset of the metadata describing an object depicted in the video;
extract the identified subset of the metadata; and
store the identified subset of the metadata;
detect a second break during playback of the video;
in response to detecting the second break, generate for display, based on the metadata, during the second break, the auxiliary video describing the object;
determine that a second user is co-located with the user;
detect, during playback of the auxiliary video, a negative reaction of the second user; and
in response to detecting the negative reaction:
prevent further display of the auxiliary video;
monitor the location of the second user;
determine that the second user is no longer co-located with the user; and
again generate for display to the user the auxiliary video.

11. The system of claim 10, wherein the control circuitry is further configured to, further in response to determining that the playback position is during the first break in the video:
process a frame of the video at the playback position to identify a plurality of candidate objects depicted in the frame;
search a database of videos and associated objects for each of the plurality of candidate objects;
identify a plurality of candidate objects having an associated video;
access, using the communications circuitry, from a profile associated with the user, user interest data;
retrieve, using the communications circuitry, metadata associated with each of the plurality of candidate objects;
compare metadata of each of the plurality of candidate objects with the user interest data;
generate a ranked list of the plurality of candidate objects based on the comparison; and select, as the object depicted in the video, a candidate object of the plurality of candidate objects having the highest rank.

12. The system of claim 11, wherein the control circuitry is further configured, when processing the frame of the video at the playback position to identify a plurality of candidate objects depicted in the frame, to:
   identify a plurality of objects depicted in the frame that satisfy predetermined criteria;
   compare each of the plurality of objects to a list of excluded objects; and
   determine, based on the comparison, as the plurality of candidate objects, a subset of the plurality of objects which do not appear on the list of excluded objects.

13. The system of claim 11, wherein the control circuitry is further configured to:
   receive, using the user input interface circuitry, during playback of the auxiliary video, a fast-forward command;
   determine, in response to receiving the fast-forward command, that the user is not interested in the object depicted in the auxiliary video; and
   in response to determining that the user is not interested in the object depicted in the auxiliary video, remove the object from the ranked list.

14. The system of claim 13, wherein the control circuitry is further configured to:
   select a second object of the plurality of objects having a second-highest rank;
   detect a third break during playback of the video; and
   in response to detecting the third break, generate for display, during the third break, second auxiliary video describing the second object.

15. The system of claim 11, wherein the control circuitry is further configured to:
   assign, based on the rank, a weighting factor to each candidate object of the plurality of candidate objects in the ranked list;
   select a second object of the plurality of objects based on the weighting factors;
   detect a third break during playback of the video; and
   in response to detecting the third break, generate for display, during the third break, second auxiliary video describing the second object.

16. The system of claim 11, wherein the control circuitry is further configured to:
   determine whether a threshold amount of time has passed since a candidate object was added to the ranked list; and
   in response to determining that the threshold amount of time has passed, remove the candidate object from the ranked list.

17. The system of claim 11, wherein the control circuitry is further configured to:
   receive, using the user input interface circuitry, during playback of the video, a second rewind command;
   in response to receiving the second rewind command, perform a second rewind operation;
   determine an end point of the second rewind operation;
   identify a second playback position of the video at the end point of the second rewind operation;
   determine whether the second playback position is during a third break in the video; and
   in response to determining that the second playback position is during the third break in the video:
      process a second frame of the video at the second playback position to identify a second plurality of candidate objects depicted in the second frame;
      search the database of videos and associated objects for each of the second plurality of candidate objects;
      identify a second plurality of candidate objects having an associated video;
      access, using the communications circuitry, from the profile associated with the user, user interest data;
      retrieve, using the communications circuitry, metadata associated with each of the second plurality of candidate objects;
      compare metadata of each of the plurality of candidate objects with the user interest data;
      update the ranked list of the plurality of candidate objects based on the comparison; and
      select, as the object depicted in the video, a candidate object of the plurality of candidate objects having the highest rank.

18. The system of claim 11, wherein the control circuitry is further configured to:
   store the ranked list in the profile associated with the user;
   detect the presence of the user at a second media device; and
   generate for display, on the second media device, auxiliary video describing the highest-ranked object.

* * * * *